US012703822B2

(12) United States Patent
Pinnawala et al.

(10) Patent No.: US 12,703,822 B2
(45) Date of Patent: Aug. 11, 2026

(54) COMPOSITIONS AND METHODS FOR BREAKING FOAMS AND EMULSIONS

(71) Applicant: CHEVRON U.S.A. INC., San Ramon, CA (US)

(72) Inventors: Gayani W. Pinnawala, Houston, TX (US); Sujeewa Palayangoda, San Ramon, CA (US); Varadarajan Dwarakanath, Houston, TX (US); Mohamad Ali Salman, Houston, TX (US); Scott Presbury West, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 19/042,790

(22) Filed: Jan. 31, 2025

(65) Prior Publication Data

US 2025/0250478 A1 Aug. 7, 2025

Related U.S. Application Data

(60) Provisional application No. 63/561,652, filed on Mar. 5, 2024, provisional application No. 63/548,690, filed on Feb. 1, 2024.

(51) Int. Cl.
*C09K 8/584* (2006.01)

(52) U.S. Cl.
CPC .................................... *C09K 8/584* (2013.01)

(58) Field of Classification Search
CPC ...................................................... C09K 8/584
See application file for complete search history.

(56) References Cited

U.S. PATENT DOCUMENTS

| | | | | |
|---|---|---|---|---|
| 3,301,328 A * | 1/1967 | Campion | ............... | C09K 8/584 166/305.1 |
| 3,811,504 A | 5/1974 | Haferkamp et al. | | |
| 3,811,505 A | 5/1974 | Flournoy et al. | | |
| 3,811,507 A | 5/1974 | Flournoy et al. | | |
| 3,890,239 A | 6/1975 | Dycus et al. | | |
| 4,463,806 A | 8/1984 | Hurd | | |

(Continued)

FOREIGN PATENT DOCUMENTS

| | | |
|---|---|---|
| WO | 2008079855 A1 | 7/2008 |
| WO | 2011094442 A1 | 8/2011 |
| WO | 2012027757 A1 | 3/2012 |

OTHER PUBLICATIONS

Dwarakanath, Varadarajan, et al., "Using co-solvents to provide gradients and improve oil recovery during chemical flooding in a light oil reservoir." SPE Symposium on Improved Oil Recovery, 2008, Paper No. SPE-113965-MS.

(Continued)

*Primary Examiner* — Crystal J Lee
(74) *Attorney, Agent, or Firm* — HUNTON ANDREWS KURTH LLP

(57) ABSTRACT

Methods and compositions for breaking foams, emulsions, or any combination thereof. The foam, emulsion, or any combination is contacted with a breaking composition. The breaking composition comprises a sulfosuccinate and a solvent. The solvent has an octanol/water partition coefficient ([P]) at 25°. The log of the partition coefficient at 25° (log [P]) is from 0.1 to 5.

19 Claims, 8 Drawing Sheets

Modified

With previous

(56) References Cited

U.S. PATENT DOCUMENTS

| | | | | |
|---|---|---|---|---|
| 5,488,148 | A | 1/1996 | Weerasooriya et al. | |
| 6,022,843 | A | 2/2000 | Shanks et al. | |
| 6,225,267 | B1 | 5/2001 | Eckard et al. | |
| 7,629,299 | B2 | 12/2009 | Berger et al. | |
| 7,770,641 | B2 | 8/2010 | Dwarakanath et al. | |
| 8,211,837 | B2 | 7/2012 | Weerasooriya et al. | |
| 9,422,469 | B2 | 8/2016 | Dwarakanath et al. | |
| 9,605,198 | B2 | 3/2017 | Shong et al. | |
| 9,617,464 | B2 | 4/2017 | Dwarakanath et al. | |
| 9,976,072 | B2 | 5/2018 | Shong et al. | |
| 2005/0199395 | A1 | 9/2005 | Berger et al. | |
| 2006/0185845 | A1 | 8/2006 | Shpakoff et al. | |
| 2006/0189486 | A1 | 8/2006 | Shpakoff et al. | |
| 2007/0191633 | A1 | 8/2007 | Berger et al. | |
| 2009/0112014 | A1 | 4/2009 | Campbell et al. | |
| 2009/0149557 | A1* | 6/2009 | Talingting-Pabalan | B01D 17/047 516/182 |
| 2009/0270281 | A1 | 10/2009 | Steinbrenner et al. | |
| 2010/0004843 | A1 | 1/2010 | Yu et al. | |
| 2010/0292110 | A1 | 11/2010 | Pope et al. | |
| 2010/0319920 | A1 | 12/2010 | Pope et al. | |
| 2011/0046024 | A1 | 2/2011 | Campbell et al. | |
| 2011/0048721 | A1 | 3/2011 | Pope et al. | |
| 2011/0059872 | A1 | 3/2011 | Weerasooriya et al. | |
| 2011/0059873 | A1 | 3/2011 | Weerasooriya et al. | |
| 2011/0071057 | A1 | 3/2011 | Weerasooriya et al. | |
| 2011/0100402 | A1 | 5/2011 | Soane et al. | |
| 2011/0190174 | A1 | 8/2011 | Weerasooriya et al. | |
| 2011/0190175 | A1 | 8/2011 | Steinbrenner et al. | |
| 2011/0201531 | A1 | 8/2011 | Sharma et al. | |
| 2017/0198202 | A1 | 7/2017 | Shong et al. | |
| 2021/0002444 | A1 | 1/2021 | Dwarakanath et al. | |
| 2021/0002544 | A1 | 1/2021 | Hahn et al. | |
| 2021/0002990 | A1 | 1/2021 | Morsy et al. | |
| 2021/0002991 | A1 | 1/2021 | Morsy et al. | |
| 2021/0179930 | A1* | 6/2021 | Pinnawala | C09K 8/035 |

OTHER PUBLICATIONS

Barnes, Julian R., et al., “Application of internal olefin sulfonates and other surfactants to EOR. Part 1: Structure-Performance relationships for selection at different reservoir conditions.” SPE Improved Oil Recovery Symposium, 2010, Paper No. SPE-129766-MS.

Palayangoda, Sujeewa S., et al., “Development and Evaluation of Novel Emulsion and Foam Breakers for Chemical EOR Applications.” SPE Improved Oil Recovery Conference, 2024, Paper No. SPE-218283-MS.

Lakr L. W., Petroleum Engineering Handbook, Society of Petroleum Engineers, p. 61-122, 2006.

Noik, Ch., et al., “Mechanism of Crude Oil/Water Interface Destabilization by Silicone Demulsifiers” International Symposium on Oilfield Chemistry, 2003, SPE J. 10(01):44-53, Paper No. SPE-80241-PA.

White, Alan, et al., “Breaking Produced Emulsions of an Alkaline Surfactant Polymer Flood,” SPE Symposium: Production Enhancement and Cost Optimisation, 2017, Paper No. SPE-189224-MS.

Boukherroub R., et al., “Oil-water mixtures and emulsions, vol. 1: Membrane materials for separation and treatment.” ACS Symposium Series, vol. 1407, p. 247-304, 2022.

Calvert J. R., et al., “Bubble size effects in foam, International Journal of Heat and Fluid Flow,” vol. 8, p. 102-106, 1987.

Chen J., et al., “Foaming of crude oil: Effect of acidic components and saturation gas, Colloids and Surfaces A: Physicochemical and engineering aspects,” vol. 553, p. 432-438, 2018.

Kokal S., “Crude oil emulsions: A state of the art review,” SPE Production and Facilities, p. 5-13, 2005.

Schramm L. L., “Petroleum emulsions, Advances in chemistry,” American chemical society: Washington, DC, 1992, vol. 231, chapter 1, pp. 1-49.

Schramm L. L., Wassmuth, F., “Foams: Fundamentals and applications in the petroleum industry,” American Chemical Society, Washington DC, 1994. vol. 242, chapter 1, pp. 3-45.

* cited by examiner

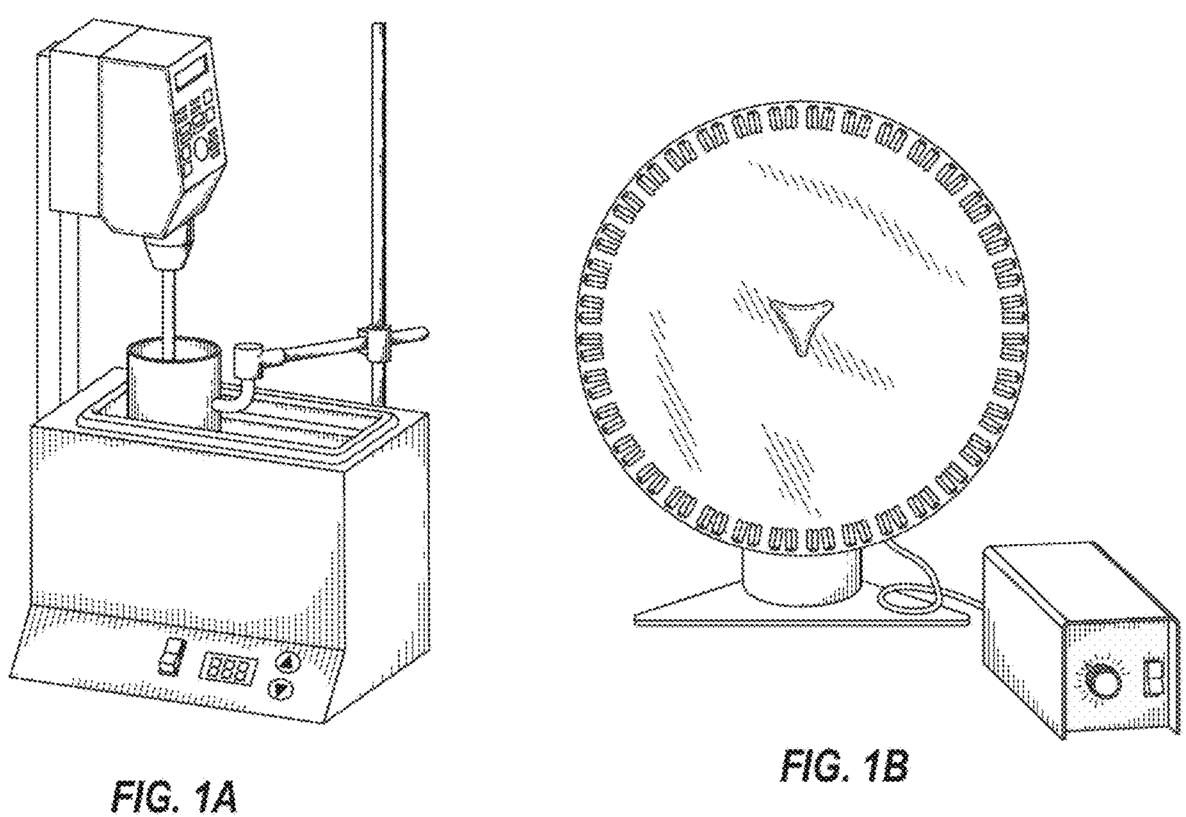
FIG. 1A
FIG. 1B
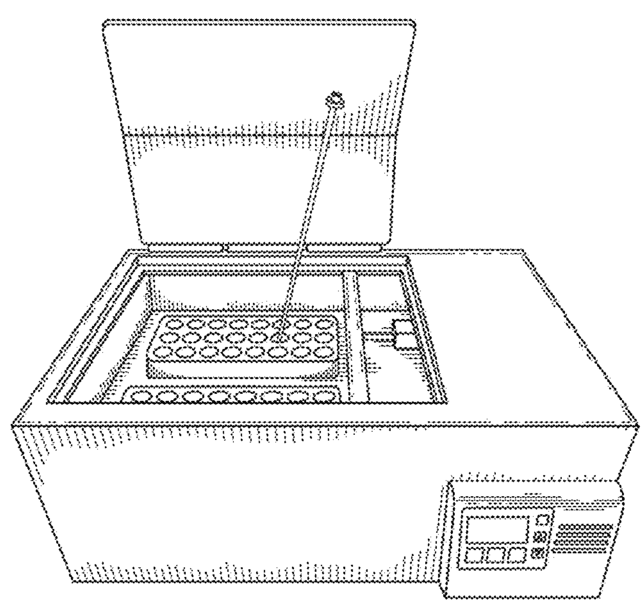
FIG. 1C

COMPOSITIONS AND METHODS FOR BREAKING FOAMS AND EMULSIONS

CROSS-REFERENCE TO RELATED APPLICATIONS

This application claims benefit of priority of U.S. Provisional Application No. 63/548,690, filed Feb. 1, 2024, and U.S. Provisional Application No. 63/561,652, filed Mar. 5, 2024, each of which is hereby incorporated by reference in its entirety.

BACKGROUND

Emulsions and foams can be formed during hydrocarbon recovery and processing. In the case of emulsions, there is often a desire to break these emulsions to separate the hydrocarbon phase for processing and use in downstream applications. Likewise, there is often a need to break foams during the course of hydrocarbon recovery and processing. To accomplish these ends, improved compositions and methods for breaking foams and emulsions are needed.

The compositions and methods described herein address these and other needs.

SUMMARY

Described herein are methods of breaking a foam, emulsion, or any combination thereof, the method including: contacting the foam, emulsion, or any combination thereof with a breaking composition described herein. In some embodiments, the breaking composition includes a sulfosuccinate and a solvent. In some embodiments, the solvent can have an octanol/water partition coefficient ([P]) at 25°, and wherein the log of the partition coefficient at 25° (log[P]) is from 0.1 to 5. In some embodiments, the breaking composition can further include a surfactant having a kraft point of at least 30° C.

In some embodiments, the surfactant can include an aryl sulfonate surfactant.

In some embodiments, the sulfosuccinate can be present in the breaking composition in a concentration of from 10% v/v to 40% v/v. In some embodiments, the aryl sulfonate surfactant can be present in the breaking composition in a concentration of from 0.5% v/v to 5% v/v. In some embodiments, the solvent can be present in the breaking composition in a concentration of from 40% v/v to 80% v/v.

In some embodiments, the solvent and the sulfosuccinate can be present in the breaking composition in a ratio of solvent to sulfosuccinate of from 1.2:1 to 10:1, such as 1.5:1, 2:1 3:1, 4:1, 5:1, 6:1, 7:1, 8:1, or 9:1. In some embodiments, the method reduces foam by at least 50%, such as from 50% to 100%.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIGS. 1A-1C shows images of a set up used for emulsion making and mixing. (1A) shows an overhead mixer, (1B) shows a rotating mixer, and (1C) shows a water bath with tube holders.

DETAILED DESCRIPTION

Figure 2:
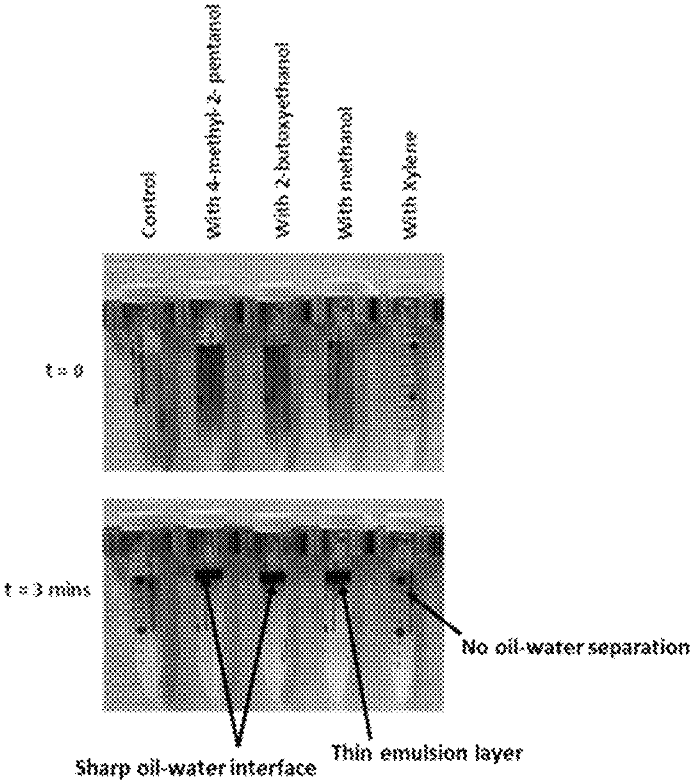
FIG. 2 shows an image of the selection of the most suitable carrier solvent based on the oil water separation.

Described herein are methods for breaking a foam, emulsion, or any combination thereof. The methods can comprise contacting the foam, emulsion, or any combination thereof with a breaking composition. The breaking composition can comprise a sulfosuccinate and a solvent. In some embodiments, the solvent can have an octanol/water partition coefficient ([P]) at 25°, and wherein the log of the partition coefficient at 25° (log[P]) is from 0.1 to 5. In some embodiments, the breaking composition can further include a surfactant having a kraft point of at least 30° C.

Also described are breaking compositions that can comprise a sulfosuccinate and a solvent. In some embodiments, the solvent can have an octanol/water partition coefficient ([P]) at 25°, and wherein the log of the partition coefficient at 25° (log[P]) is from 0.1 to 5. In some embodiments, the breaking composition can further include a surfactant having a kraft point of at least 30° C.

Definitions

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Other than where noted, all numbers expressing quantities of ingredients, reaction conditions, geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Accordingly, these terms are intended to not only cover the recited element(s) or step(s), but may also include other elements or steps not expressly recited. Furthermore, as used herein, the use of the terms "a", "an", and "the" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

Ranges can be expressed herein as from "about" one particular value, and/or to "about" another particular value. By "about" is meant within 10% of the value, e.g., within 9, 8, 7, 6, 5, 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. A range may be construed to include the start and the end of the range. For example, a range of 10% to 20% (i.e., range of 10%-20%) can includes 10% and also includes 20%, and includes percentages in between 10% and 20%, unless explicitly stated otherwise herein.

As used herein, the terms "may," "optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

The term "enhanced oil recovery" refers to techniques for increasing the amount of unrefined petroleum (e.g., crude oil) that may be extracted from an oil reservoir. Using EOR, more of the reservoir's original oil can typically be extracted compared with only using primary and secondary recovery (e.g., by water injection or natural gas injection). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, as well as combinations thereof such as alkaline-polymer flooding or alkaline-surfactant-polymer flooding), In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, or any combination thereof. The terms "operation" and "application" may be used interchangeability herein, as in EOR operations or EOR applications. Other operations can also be performed on subterranean formations to facilitate hydrocarbon recovery, such as thermal recovery operations (including, for example, cyclic steam and steam flooding).

The term "hydrocarbon" refers to a compound containing only carbon and hydrogen atoms.

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of liquid hydrocarbons and gas hydrocarbons (e.g., including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term "reservoir" or "subsurface reservoir" or "subsurface region of interest" or "subsurface formation" or "subsurface volume of interest" or "subterranean formation". For example, in some embodiments, the reservoir may be, but is not limited to, a shale reservoir, a carbonate reservoir, a tight sandstone reservoir, a tight siltstone reservoir, etc. Indeed, the terms "formation," "hydrocarbon," and the like are not limited to any description or configuration described herein.

A "wellbore" refers to a single hole, usually cylindrical, that is drilled into a subsurface volume of interest. A wellbore may be drilled in one or more directions. For example, a wellbore may include a vertical wellbore, a horizontal wellbore, a deviated wellbore, and/or other type of wellbore. A wellbore may be drilled in the formation for exploration and/or recovery of resources. For example, a wellbore may be drilled in the formation to aid in extraction and/or production of resources such as hydrocarbons. As another example, a wellbore may be drilled in the formation for fluid injection. A plurality of wellbores (e.g., tens to hundreds of wellbores) are often used in a field depending on the desired outcome.

A wellbore may be drilled into a formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit may be removed, and then the casing, the tubing, and/or other equipment may be installed according to the design of the wellbore may be installed according to the design of the wellbore. The equipment to be used in drilling the wellbore may be dependent on the design of the wellbore, the formation, the hydrocarbons, and/or other factors.

A wellbore may include a plurality of components, such as, but not limited to, a casing, a liner, a tubing string, a sensor, a packer, a screen, a gravel pack, artificial lift equipment (e.g., an electric submersible pump (ESP)), and/or other components. If a wellbore is drilled offshore, the wellbore may include one or more of the previous components plus other offshore components, such as a riser. A wellbore may also include equipment to control fluid flow into the wellbore, control fluid flow out of the wellbore, or any combination thereof. For example, a wellbore may include a wellhead, a choke, a valve, and/or other control devices. These control devices may be located on the surface, in the subsurface (e.g., downhole in the wellbore), or any combination thereof. In some embodiments, the same control devices may be used to control fluid flow into and out of the wellbore. In some embodiments, different control devices may be used to control fluid flow into and out of a wellbore. In some embodiments, the rate of flow of fluids through the wellbore may depend on the fluid handling capacities of the surface facility that is in fluidic communication with the wellbore. The equipment to be used in controlling fluid flow into and out of a wellbore may be dependent on the wellbore, the formation, the surface facility, and/or other factors. Moreover, sand control equipment and/or sand monitoring equipment may also be installed (e.g., downhole and/or on the surface). A wellbore may also include any completion hardware that is not discussed separately. The term "wellbore" may be used synonymously with the terms "borehole," "well," or "well bore." The term "wellbore" is not limited to any description or configuration described herein.

"Slickwater," as used herein, refers to water-based aqueous solution comprising a friction reducer which is typically pumped at high rates to fracture a reservoir. Optionally when employing slickwater, smaller sized proppant particles (e.g., 40/70 or 50/140 mesh size) are used due to the fluid having a relatively low viscosity (and therefore a diminished ability to transport sizable proppants relative to more viscous fluids). In some embodiments, proppants are added to some stages of completion during production of an unconventional reservoir. In some embodiments, slickwater is injected with a small quantity of proppant.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e., organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e., API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin-based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil, as referred to herein, is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbons, hydrocarbon material, or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain C11-C20 alkyl chains, including napthenic acid mixtures. The recovery of such "reactive" oils may be performed using alkali (e.g., NaOH, $NaHCO_3$, or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "productivity" as applied to a petroleum or oil well refers to the capacity of a well to produce hydrocarbons (e.g., unrefined petroleum); that is, the ratio of the hydrocarbon flow rate to the pressure drop, where the pressure drop is the difference between the average reservoir pressure and the flowing bottom hole well pressure (i.e., flow per unit of driving force).

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its case of fluidity.

The term "salinity" as used herein, refers to concentration of salt dissolved in an aqueous phase. Examples for such salts are without limitation, sodium chloride, magnesium and calcium sulfates, and bicarbonates. In more particular, the term salinity as it pertains to the present invention refers to the concentration of salts in brine and surfactant solutions.

"Fracturing fluid," as used herein, refers to an injection fluid that is injected into the well under pressure in order to cause fracturing within a portion of the reservoir.

"Kraft point" as used herein, refers to the temperature at which a surfactant solution gives a clear transparent solution, below that temperature the surfactant solution is cloudy.

Unless defined otherwise, all technical and scientific terms used herein have the same meanings as commonly understood by one of skill in the art to which the disclosed invention belongs. Unless otherwise specified, all percentages are in weight percent and the pressure is in atmospheres.

Breaking Compositions

Provided herein are breaking compositions including a sulfosuccinate and a solvent.

In some embodiments, the solvent can have an octanol/water partition coefficient ([P]) at 25°, wherein the log of the partition coefficient at 25° (log[P]) can be from 0.1 to 5, such as from 0.1 to 3, from 0.1 to 2, from 0.1 to 1.5, from 0.1 to 1, from 0.1 to 0.8, or from 0.1 to 0.7.

In some embodiments, the composition can further include a surfactant having a kraft point of at least 30° C. In some embodiments, the surfactant can have a kraft point of at least 30° C. (e.g., at least 40° C., at least 50° C., at least 60° C., or at least 70° C.). In some embodiments, the surfactant can have a kraft point of 70° C. or less (e.g., 60° C. or less, 50° C. or less, or 40° C. or less).

The surfactant can have a kraft point ranging from any of the minimum values described above to any of the maximum values described above. For example, in some embodiments, the surfactant can have a kraft point of from 30° C. to 70° C. (e.g., from 40° C. to 70° C., from 50° C. to 70° C., from 60° C. to 70° C., from 30° C. to 60° C., from 40° C. to 60° C., from 50° C. to 60° C., from 30° C. to 50° C., from 40° C. to 50° C., or from 30° C. to 40° C.).

In some embodiments, the surfactant can include an aryl sulfonate surfactant. In some embodiments, the breaking composition can include a sulfosuccinate, an aryl sulfonate surfactant, and a solvent. In some embodiments, the aryl sulfonate surfactant can include an alkyl aryl sulfonate surfactant, an alkoxy aryl sulfonate surfactant, or any combination thereof. In some embodiments, the aryl sulfonate surfactant can include an alkyl aryl sulfonate. In some embodiments, the aryl sulfonate surfactant comprises an alkoxy aryl sulfonate. In some embodiments, the aryl sulfonate is a branched alkyl aryl sulfonate.

In some embodiments, the aryl sulfonate surfactant can be present in the breaking composition in a concentration of at least 0.5% v/v (e.g., at least 1% v/v, at least 1.5% v/v, at least 2% v/v, at least 2.5% v/v, at least 3% v/v, at least 3.5% v/v, at least 4% v/v, or at least 4.5% v/v). In some embodiments, the aryl sulfonate surfactant can be present in the breaking composition in a concentration of 5% v/v or less (e.g., 4.5% v/v or less, 4% v/v or less, 3.5% v/v or less, 3% v/v or less, 2.5% v/v or less, 2% v/v or less, 1.5% v/v or less, or 1% v/v or less).

The aryl sulfonate surfactant can be present in the breaking composition in a concentration ranging from any of the minimum values described above to any of the maximum values described above. For example, in some embodiments, the aryl sulfonate surfactant can be present in the breaking composition in a concentration of from 0.5% v/v to 5% v/v (e.g., from 1% v/v to 5% v/v, from 1.5% v/v to 5% v/v, from 2% v/v to 5% v/v, from 2.5% v/v to 5% v/v, from 3% v/v to 5% v/v, from 3.5% v/v to 5% v/v, from 4% v/v to 5% v/v, from 4.5% v/v to 5% v/v, from 0.5% v/v to 4% v/v, from 1% v/v to 4% v/v, from 1.5% v/v to 4% v/v, from 2% v/v to 4% v/v, from 2.5% v/v to 4% v/v, from 3% v/v to 4% v/v, from 3.5% v/v to 4% v/v, from 0.5% v/v to 3% v/v, from 1% v/v to 3% v/v, from 1.5% v/v to 3% v/v, from 2% v/v to 3% v/v, from 2.5% v/v to 3% v/v, from 0.5% v/v to 2% v/v, from 1% v/v to 2% v/v, or from 1.5% v/v to 2% v/v. In some embodiments, the aryl sulfonate surfactant can be present in the breaking composition in a concentration of from 0.8% v/v to 3% v/v.

Example aryl sulfonate surfactants can include a hydrophobic tail that comprises from 6 to 60 carbon atoms. In some embodiments, the aryl sulfonate surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the aryl sulfonate surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The aryl sulfonate surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the aryl sulfonate surfactant can include a branched hydrophobic tail derived from Guerbet alcohols. The hydrophilic portion of the aryl sulfonate surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the aryl sulfonate surfactant can further include, for example a sulfate, a disulfate, a polysulfate, a sulfosuccinate, a disulfosuccinate, a polysulfosuccinate, a carboxylate, a dicarboxylate, a polycarboxylate, or any combination thereof.

In some embodiments, the aryl sulfonate surfactant can include an aryl sulfonate surfactant (e.g., tristyryl phenol sulfonate (TSP) or tristyryl phenol polysulfonate), alkyl aryl sulfonate surfactant (AAS) (e.g. an alkyl benzene sulfonate (ABS)), an alkoxy aryl sulfonate surfactant (e.g., tristyryl phenol alkoxylate polysulfonate), or any combination thereof.

An "aryl sulfonate surfactant" or "aryl sulfonate" refers to a compound having an aryl group attached to $—SO_3^-$ or acid or salt thereof including metal cations such as sodium. In some cases, the aryl group can be substituted, for example, with an alkyl group (an alkyl aryl sulfonate) or an alkoxy group (an alkoxy aryl sulfonate).

An "alkoxy aryl sulfonate surfactant" or "alkoxy aryl sulfonate" refers to a surfactant having an aryl attached to one or more alkoxylene groups (typically $—CH_2—CH$(ethyl)-O—, $—CH_2—CH$(methyl)-O—, or $—CH_2—CH_2—O—$) which, in turn is attached to $—SO_3$ or acid or salt thereof including metal cations such as sodium. In some embodiment, the alkoxy aryl sulfonate surfactant has the formula $R—(BO)_e—(PO)_f-(EO)_g—SO_3$ or acid or salt (including metal cations such as sodium) thereof, wherein R is C6-C32 aryl, BO is $—CH_2—CH$(ethyl)-O—, PO is $—CH_2—CH$(methyl)-O—, and EO is $—CH_2—CH_2—O—$. The symbols e, f and g are integers from 0 to 50 wherein at least one is not zero.

In some examples, the aryl sulfonate surfactant can include a surfactant defined by the formula below:

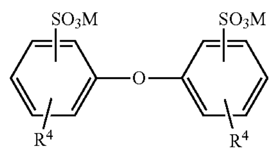

wherein $R^4$ is, independently for each occurrence, a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

In some examples, the tristyryl phenol polysulfonate surfactant and tristyryl phenol alkoxylate polysulfonate surfactant can include a surfactant defined by the formula below:

Formula I

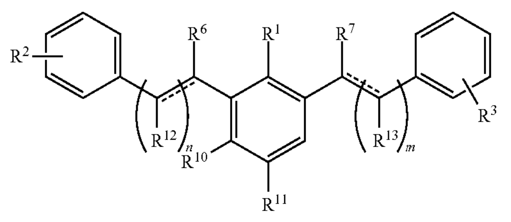

wherein:

$R^1$ is —OH, —$OSO_3$, —$(PO)_x$-$(EO)_y$-A, —$(BO)_z$—$(PO)_x$-$(EO)_y$-A, or

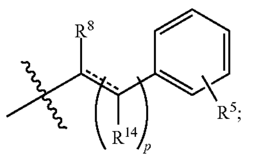

$R^2$-$R^5$ are each independently H or —$SO_3$;

$R^6$-$R^9$ and $R^{12}$-$R^{15}$ are each independently H, —OH, —$SO_3$, or $C_1$-$C_6$ alkyl;

$R^{10}$ is H—$(PO)_x$-$(EO)_y$-A, or —$(BO)_z$—$(PO)_x$-$(EO)_y$-A;

$R^{11}$ is H or

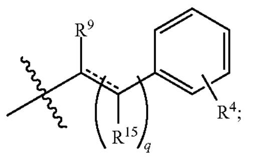

A is —OH, —$OSO_3$, —$SO_3$, monocarboxylate, dicarboxylate, or tricarboxylate;

BO represents —$CH_2$—CH(ethyl)-O—;

EO represents —$CH_2$—$CH_2$—O—;

PO represents —$CH_2$—CH(methyl)-O—; x is 0 to 65;

y is 0 to 100;

z is 0 to 10;

n, m, p, and q are each independently 0 to 6; and the dotted line represents an optional double bond if valence permits;

at least two of $R^1$-$R^9$, $R^{12}$-$R^{14}$ or A are independently-$SO_3$;

wherein when:

$R^1$ is

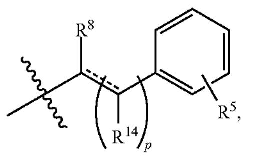

then $R^{11}$ is H;

$R^{11}$ is

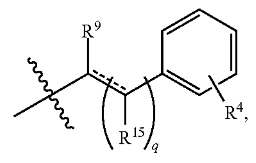

then $R^1$ is H;

one of $R^6$ or $R^{12}$ is —$SO_3$, then one of $R^6$ or $R^{12}$ is H, —OH, or $C_1$-$C_6$ alkyl;

one of $R^6$ or $R^{12}$ is —OH, then one of $R^6$ or $R^{12}$ is H, —$SO_3$ or $C_1$-$C_6$ alkyl;

one of $R^8$ or $R^{14}$ is —$SO_3$, then one of $R^8$ or $R^{14}$ is H, —OH, or $C_1$-$C_6$ alkyl;

one of $R^8$ or $R^{14}$ is —OH, then one of $R^8$ or $R^{14}$ is H, —$SO_3$ or $C_1$-$C_6$ alkyl;

one of $R^7$ or $R^{13}$ is —$SO_3$, then one of $R^7$ or $R^{13}$ is H, —OH, or $C_1$-$C_6$ alkyl;

one of $R^7$ or $R^{13}$ is —OH, then one of $R^7$ or $R^{13}$ is H, —$SO_3$ or $C_1$-$C_6$ alkyl;

one of $R^9$ or $R^{15}$ is —$SO_3$, then one of $R^9$ or $R^{15}$ is H, —OH, or $C_1$-$C_6$ alkyl; and one of $R^9$ or $R^{15}$ is —OH, then one of $R^9$ or $R^{15}$ is H, —$SO_3$ or $C_1$-$C_6$ alkyl.

Suitable sulfosuccinates can include, but are not limited to, sodium bis(1,3-dimethylbutyl) sulfosuccinate, dioctyl sulfosuccinate, sodium dihexyl sulfosuccinate, sulfosuccinic acid, monoester with alcohols $C_{10}$-16 and EO, disodium salts, sodium diamyl sulfosuccinate, butanedioic acid, 2-sulfo-, 1,4-dioctyl ester, sodium salt, or any combination thereof.

In some embodiments, the sulfosuccinate can be present in the breaking composition in a concentration of at least 10% v/v (e.g., at least 15% v/v, at least 20% v/v, at least 25% v/v, at least 30% v/v, or at least 35% v/v). In some embodiments, the sulfosuccinate can be present in the breaking composition in a concentration of 40% v/v or less (e.g., 35% v/v or less, 30% v/v or less, 25% v/v or less, 20% v/v or less, or 15% v/v or less).

The sulfosuccinate can be present in the breaking composition in a concentration ranging from any of the minimum values described above to any of the maximum values described above. For example, in some embodiments, the sulfosuccinate can be present in the breaking composition in a concentration of from 10% v/v to 40% v/v (e.g., from 10% v/v to 35% v/v, from 15% v/v to 35% v/v, from 20% v/v to 35% v/v, from 25% v/v to 35% v/v, from 30% v/v to 35% v/v, from 15% v/v to 40% v/v, from 20% v/v to 40% v/v, from 25% v/v to 40% v/v, from 30% v/v to 40% v/v, from 35% v/v to 40% v/v, from 10% v/v to 30% v/v, from 15% v/v to 30% v/v, from 20% v/v to 30% v/v, from 25% v/v to 30% v/v, from 10% v/v to 25% v/v, from 15% v/v to 25% v/v, from 20% v/v to 25% v/v, from 10% v/v to 20% v/v, from 15% v/v to 20% v/v, or from 20% v/v to 25% v/v. In some embodiments, the sulfosuccinate can be present in the breaking composition in a concentration of from 12% v/v to 35% v/v. In some embodiments, the sulfosuccinate can be present in the breaking composition in a concentration of from 15% v/v to 25% v/v (e.g., from 19% v/v to 23% v/v) sulfosuccinate.

In some embodiments, the solvent can include an alcohol, an ether, an aromatic organic solvent, or any combination thereof.

In some embodiments, the solvent can include a first solvent that exhibits an octanol/water partition coefficient ([P]) at 25°, wherein the log of the partition coefficient at 25° (log[P]) can be from 0.1 to 5, such as from 0.1 to 3, from 0.1 to 2, from 0.1 to 1.5, from 0.1 to 1, from 0.1 to 0.8, or from 0.1 to 0.7, one or more additional solvents that exhibit octanol/water partition coefficients ([P]) at 25° within this range, one or more additional solvents that exhibit octanol/water partition coefficients ([P]) at 25° outside of this range, or any combination thereof.

In some embodiments, the solvent can include an alcohol that exhibits an octanol/water partition coefficient ([P]) at 25°, wherein the log of the partition coefficient at 25° (log[P]) can be from 0.1 to 5, such as from 0.1 to 3, from 0.1 to 2, from 0.1 to 1.5, from 0.1 to 1, from 0.1 to 0.8, or from 0.1 to 0.7, and one or more additional alcohols that exhibit octanol/water partition coefficients ([P]) at 25° outside of this range. In some embodiments, the first alcohol that exhibits an octanol/water partition coefficient ([P]) at 25° of from 0.1 to 5 can be present in an amount of from 50% v/v to 90% v/v, and the one or more additional alcohols that exhibit octanol/water partition coefficients ([P]) at 25° outside of the range of from 0.1 to 5 can be present in an amount of from 0.1% v/v to 15% v/v.

In some embodiments, the solvent can include an alcohol (e.g., a branched $C_3$-$C_{10}$ alcohol). In some examples, the alcohol can comprise hexanol (e.g., n-hexanol), isopropanol, 2-ethylhexanol (e.g., 2-ethyl-1-hexanol), 4-methyl-2-pentanol (also known as methylisobutyl carbinol), 2-butoxyethanol, benzyl alcohol, isobutanol, sec-butanol, tert-butanol, pentaerythritol, trimethylolpropane, glycerol, ethylene glycol, propylene glycol, or any combination thereof. In some embodiments, the alcohol can be a polyol (e.g., pentaerythritol, trimethylolpropane, glycerol, ethylene glycol, propylene glycol, or any combination thereof). In some embodiments, the alcohol can comprise a diol. In some embodiments, the alcohol can comprise a triol.

In some embodiments, the alcohol can comprise glycerol. In some embodiments, the alcohol can comprise glycerol and ethylene glycol. In some embodiments, the alcohol can comprise 4-methyl-2-pentanol. In some embodiments, the alcohol can comprise glycerol, ethylene glycol, 4-methyl-2-pentanol, or any combination thereof. In some embodiments, the alcohol can comprise glycerol, ethylene glycol, and 4-methyl-2-pentanol. In some embodiments, the alcohol can comprise glycerol and 4-methyl-2-pentanol.

In some embodiments, the solvent can include an ether, such as alkyl ethoxylate. In some examples, the ether can comprise ethylene glycol butyl ether (EGBE), diethylene glycol monobutyl ether (DGBE), triethylene glycol monobutyl ether (TEGBE), ethylene glycol dibutyl ether (EGDE), propylene glycol butyl ether, ethylene glycol monophenyl ether, phenol-2EO, phenol-4EO, phenol-1PO-2EO, phenol-2PO-2EO, or any combination thereof. In some examples, the ether can comprise ethylene glycol butyl ether (EGBE), diethylene glycol monobutyl ether (DGBE), triethylene glycol monobutyl ether (TEGBE), ethylene glycol dibutyl ether (EGDE), or any combination thereof. In some embodiments, the solvent can include an aromatic organic solvent, such as toluene, xylene, or any combination thereof.

In some embodiments, the solvent can be present in the breaking composition in a concentration of at least 40% v/v (e.g., at least 50% v/v, at least 55% v/v, at least 60% v/v, at least 65% v/v, at least 70% v/v, at least 75% v/v, at least 80% v/v, or at least 85% v/v). In some embodiments, the solvent can be present in the breaking composition in a concentration of 90% v/v or less (e.g., 85% v/v or less, 80% v/v or less, 75% v/v or less, 70% v/v or less, 65% v/v or less, 60% v/v or less, 55% v/v or less, 50% v/v or less, or 45% v/v or less).

The solvent can be present in the breaking composition in a concentration ranging from any of the minimum values described above to any of the maximum values described above. For example, in some embodiments, the solvent can be present in the breaking composition in a concentration of from 40% v/v to 90% v/v (e.g., from 40% v/v to 80% v/v, from 50% v/v to 90% v/v, from 60% v/v to 90% v/v, from 40% v/v to 85% v/v, from 50% v/v to 85% v/v, from 60% v/v to 85% v/v, from 50% v/v to 80% v/v, from 60% v/v to 80% v/v, from 70% v/v to 80% v/v, from 40% v/v to 70% v/v, from 50% v/v to 70% v/v, from 60% v/v to 70% v/v, from 40% v/v to 60% v/v, from 50% v/v to 60% v/v, or from 40% v/v to 50% v/v). In some embodiments, the solvent can be present in the breaking composition in a concentration of from 70% v/v to 80% v/v (e.g., from 74% v/v to 78% v/v).

In some embodiments, the solvent and the sulfosuccinate are present in the breaking composition in a ratio of at least 1.2:1 (e.g., at least 1.5:1, at least 2:1, at least 3:1, at least 4:1, at least 5:1, at least 6:1, at least 7:1, at least 8:1, or at least 9:1). In some embodiments, the solvent and the sulfosuccinate are present in the breaking composition in a ratio of 9:1 or less (e.g., 8:1 or less, 7:1 or less, 6:1 or less, 5:1 or less, 4:1 or less, 3:1 or less, 2:1 or less, or 1.5:1 or less).

The solvent and the sulfosuccinate are present in the breaking composition in a ratio ranging from any of the minimum values described above to any of the maximum values described above. For example, in some embodiments, the solvent and the sulfosuccinate are present in the breaking composition in a ratio of solvent to sulfosuccinate of from 1.2:1 to 10:1 (e.g., from 1.5:1 to 10:1, from 2:1 to 10:1, from 3:1 to 10:1, from 4:1 to 10:1, from 5:1 to 10:1, from 6:1 to 10:1, from 7:1 to 10:1, from 8:1 to 10:1, from 9:1 to 10:1, from 1.2:1 to 9:1, from 1.2:1 to 8:1, from 1.2:1 to 7:1, from 1.2:1 to 6:1, from 1.2:1 to 5:1, from 1.2:1 to 4:1, from 1.2:1 to 3:1, from 1.2:1 to 2:1, from 1.2:1 to 1.5:1, from 1.5:1 to 9:1, from 1.5:1 to 8:1, from 1.5:1 to 7:1, from 1.5:1 to 6:1, from 1.5:1 to 5:1, from 1.5:1 to 4:1, from 1.5:1 to 3:1, from 1.5:1 to 2:1, from 2:1 to 9:1, from 2:1 to 8:1, from 2:1 to 7:1, from 2:1 to 6:1, from 2:1 to 5:1, from 2:1 to 4:1, from 2:1 to 3:1, from 3:1 to 9:1, from 3:1 to 8:1, from 3:1 to 7:1, from 3:1 to 6:1, from 3:1 to 5:1, from 3:1 to 4:1, from 4:1 to 9:1, from 4:1 to 8:1, from 4:1 to 7:1, from 4:1 to 6:1, from 4:1 to 5:1, from 5:1 to 9:1, from 5:1 to 8:1, from 5:1 to 7:1, from 5:1 to 6:1, from 6:1 to 9:1, from 6:1 to 8:1, from 6:1 to 7:1, from 7:1 to 8:1, from 7:1 to 9:1, or from 8:1 to 9:1, In some embodiments, the sulfosuccinate, solvent, and aryl sulfonate surfactant are present in the breaking composition in a ratio of at least 1:1.2:0.05 (e.g., at least 1:1.2:0.05, at least 1:2:0.05, at least 1:3:0.05, at least 1:4:0.05, at least 1:5:0.05, at least 1:6:0.05, at least 1:7:0.05, at least 1:8:0.05, or at least 1:9:0.05). In some embodiments, the sulfosuccinate, solvent, and aryl sulfonate surfactant are present in the breaking composition in a ratio of 1:10:0.1 or less (e.g., 1:9:0.05 or less, 1:8:0.05 or less, 1:7:0.05 or less, 1:6:0.05 or less, 1:5:0.05 or less, 1:4:0.05 or less, 1:3:0.05 or less, 1:2:0.05 or less, 1:1.5:0.05 or less, 1:9:0.1 or less, 1:8:0.1 or less, 1:7:0.1 or less, 1:6:0.1 or less, 1:5:0.1 or less, 1:4:0.1 or less, 1:3:0.1 or less, 1:2:0.1 or less, or 1:1.5:0.1 or less).

The sulfosuccinate, solvent, and aryl sulfonate surfactant are present in the breaking composition in a ratio ranging from any of the minimum values described above to any of the maximum values described above. For example, in some embodiments, the sulfosuccinate, solvent, and aryl sulfonate surfactant are present in the breaking composition in a ratio of sulfosuccinate to solvent to aryl sulfonate surfactant of from 1:1.2:0.05 to 1:10:0.1 (e.g., from 1:1.5:0.05 to 1:10:0.1, from 1:1.5:0.05 to 1:9:0.1, from 1:1.5:0.05 to 1:8:0.1, from 1:1.5:0.05 to 1:7:0.1, from 1:1.5:0.05 to 1:6:0.1, from 1:1.5:0.05 to 1:5:0.1, from 1:1.5:0.05 to 1:4:0.1, from 1:1.5:0.05 to 1:3:0.1, from 1:1.5:0.05 to 1:2:0.1, from 1:1.5:0.05 to 1:1.5:0.1, from 1:1.5:0.05 to 1:10:0.05, from 1:1.5:0.05 to 1:9:0.05, from 1:1.5:0.05 to 1:8:0.05, from 1:1.5:0.05 to 1:7:0.05, from 1:1.5:0.05 to 1:6:0.05, from 1:1.5:0.05 to 1:5:0.05, from 1:1.5:0.05 to 1:4:0.05, from 1:1.5:0.05 to 1:3:0.05, from 1:1.5:0.05 to 1:2:0.05, from 1:2.5:0.05 to 1:10:0.1, from 1:2.5:0.05 to 1:9:0.1, from 1:2.5:0.05 to 1:8:0.1, from 1:2.5:0.05 to 1:7:0.1, from 1:2.5:0.05 to 1:6:0.1, from 1:2.5:0.05 to 1:5:0.1, from 1:2.5:0.05 to 1:4:0.1, from 1:2.5:0.05 to 1:3:0.1, from 1:2.5:0.05 to 1:2:0.1, from 1:2.5:0.05 to 1:1.5:0.1, from 1:2.5:0.05 to 1:10:0.05, from 1:2.5:0.05 to 1:9:0.05, from 1:2.5:0.05 to 1:8:0.05, from 1:2.5:0.05 to 1:7:0.05, from 1:2.5:0.05 to 1:6:0.05, from 1:2.5:0.05 to 1:5:0.05, from 1:2.5:0.05 to 1:4:0.05, from 1:2.5:0.05 to 1:3:0.05, from 1:5:0.05 to 1:10:0.1, from 1:5:0.05 to 1:9:0.1, from 1:5:0.05 to 1:8:0.1, from 1:5:0.05 to 1:7:0.1, from 1:5:0.05 to 1:6:0.1, from 1:5:0.05 to 1:5:0.1, from 1:5:0.05 to 1:4:0.1, from 1:5:0.05 to 1:3:0.1, from 1:5:0.05 to 1:2:0.1, from 1:5:0.05 to 1:1.5:0.1, from 1:5:0.05 to 1:10:0.05, from 1:5:0.05 to 1:9:0.05, from 1:5:0.05 to 1:8:0.05, from 1:5:0.05 to 1:7:0.05, from 1:5:0.05 to 1:6:0.05, from 1:7.5:0.05 to 1:10:0.1, from 1:7.5:0.05 to 1:9:0.1, from 1:7.5:0.05 to 1:8:0.1, from 1:7.5:0.05 to 1:7:0.1, from 1:7.5:0.05 to 1:6:0.1, from 1:7.5:0.05 to 1:5:0.1, from 1:7.5:0.05 to 1:4:0.1, from 1:7.5:0.05 to 1:3:0.1, from 1:7.5:0.05 to 1:2:0.1, from 1:7.5:0.05 to 1:1.5:0.1, from 1:7.5:0.05 to 1:10:0.05, from 1:7.5:0.05 to 1:9:0.05, or from 1:7.5:0.05 to 1:8:0.05) . . . .

In some embodiments, the solvent can have a dielectric constant of from 1 to 50, such as from 1 to 35, from 1 to 30, from 1 to 25, from 1 to 15, from 15 to 35, from 15 to 30, or from 15 to 25.

In some embodiments, the solvent can have an octanol-water partition coefficient represented by P and defined by the equation below:

$$[P] = \frac{[X]^{octanol}}{[X]^{water}}$$

i.e., the ratio of concentrations of the substance (mole/volume) in octanol ($[X]^{octanol}$) and water ($[X]^{water}$) at equilibrium. For purposes of describing the partitioning agents described herein, in some embodiments, the log of the partition coefficient at 25° (log[P]) can be from −1 to 5, such as from −1 to 3, from −1 to 2, from −1 to 1.5, from −1 to 1, from −1 to 0.8, from −1 to 0.7, from 0.01 to 5, from 0.01 to 3, from 0.01 to 2, from 0.01 to 1, from 0.1 to 5, from 0.1 to 3, from 0.1 to 2, from 0.1 to 1, from 0.1 to 0.7, from 0.1 to 0.5, from 0.5 to 5, from 0.5 to 3, from 0.5 to 2, from 1 to 5, from 1 to 3, or from 1 to 2.

In some embodiments, the breaking composition can include a sulfosuccinate, and 4-methyl-2-pentanol. In some embodiments, the breaking composition can include a sulfosuccinate, an aryl sulfonate surfactant, and 4-methyl-2-pentanol. In some embodiments, the breaking composition can include a sulfosuccinate, an alkyl aryl sulfonate surfactant, and 4-methyl-2-pentanol. In some embodiments, the breaking composition can include a sulfosuccinate, a branched alkyl aryl sulfonate surfactant, and 4-methyl-2-pentanol. In some embodiments, the breaking composition can include a sulfosuccinate, an alkoxy aryl sulfonate surfactant, and 4-methyl-2-pentanol. In some embodiments, the breaking composition can comprise a sulfosuccinate and glycerol. In some embodiments, the breaking composition can comprise a sulfosuccinate and ethylene glycol. In some embodiments, the breaking composition can comprise a sulfosuccinate, glycerol, and 4-methyl-2-pentanol. In some embodiments, the breaking composition can comprise a sulfosuccinate, ethylene glycol, and 4-methyl-2-pentanol. In some embodiments, the breaking composition can comprise a sulfosuccinate, glycerol, ethylene glycol, and 4-methyl-2-pentanol.

In some embodiments, the 4-methyl-2-pentanol can be present in the breaking composition in a concentration of at least 40% v/v (e.g., at least 50% v/v, at least 55% v/v, at least 60% v/v, at least 65% v/v, at least 70% v/v, at least 75% v/v, at least 80% v/v, or at least 85% v/v). In some embodiments, the 4-methyl-2-pentanol can be present in the breaking composition in a concentration of 90% v/v or less (e.g., 85% v/v or less, 80% v/v or less, 75% v/v or less, 70% v/v or less, 65% v/v or less, 60% v/v or less, 55% v/v or less, 50% v/v or less, or 45% v/v or less).

The 4-methyl-2-pentanol can be present in the breaking composition in a concentration ranging from any of the minimum values described above to any of the maximum values described above. For example, in some embodiments, the 4-methyl-2-pentanol can be present in the breaking composition in a concentration of from 40% v/v to 90% v/v (e.g., from 40% v/v to 80% v/v, from 50% v/v to 90% v/v, from 60% v/v to 90% v/v, from 40% v/v to 85% v/v, from 50% v/v to 85% v/v, from 60% v/v to 85% v/v, from 50% v/v to 80% v/v, from 60% v/v to 80% v/v, from 70% v/v to 80% v/v, from 40% v/v to 70% v/v, from 50% v/v to 70% v/v, from 60% v/v to 70% v/v, from 40% v/v to 60% v/v, from 50% v/v to 60% v/v, or from 40% v/v to 50% v/v).

In some embodiments, the 4-methyl-2-pentanol can be present in the breaking composition in a concentration of from 70% v/v to 80% v/v (e.g., from 70% v/v to 72% v/v, from 70% v/v to 73% v/v, from 70% v/v to 74% v/v, from 70% v/v to 75% v/v, from 70% v/v to 76% v/v, from 70% v/v to 77% v/v, from 70% v/v to 78% v/v, from 70% v/v to 79% v/v, from 71% v/v to 73% v/v, from 71% v/v to 74% v/v, from 71% v/v to 75% v/v, from 71% v/v to 76% v/v, from 71% v/v to 77% v/v, from 71% v/v to 78% v/v, from 71% v/v to 79% v/v, from 71% v/v to 80% v/v, from 72% v/v to 74% v/v, from 72% v/v to 75% v/v, from 72% v/v to 76% v/v, from 72% v/v to 77% v/v, from 72% v/v to 78% v/v, from 72% v/v to 79% v/v, from 72 9% v/v to 80% v/v, from 73% v/v to 75% v/v, from 73% v/v to 76% v/v, from 73% v/v to 77% v/v, from 73% v/v to 78% v/v, from 73% v/v to 79% v/v, from 73% v/v to 80% v/v, from 74 9% v/v to 76% v/v, from 74% v/v to 77% v/v, from 74% v/v to 78% v/v, from 74% v/v to 79% v/v, from 74% v/v to 80% v/v, from 75% v/v to 77% v/v, from 75% v/v to 78% v/v, from 75% v/v to 79% v/v, from 75% v/v to 80% v/v, from 76% v/v to 78% v/v, from 76% v/v to 79% v/v, from 76% v/v to 80% v/v, from 77% v/v to 79% v/v, from 77% v/v to 80% v/v, or from 78% v/v to 80% v/v). In some embodiments, the 4-methyl-2-pentanol can be present in the breaking composition in a concentration of from 73% v/v to 75% v/v.

In some embodiments, the glycerol can be present in the breaking composition in a concentration of from 0.05% v/v to 20% v/v (e.g., from 0.05% v/v to 17.5% v/v, from 0.05% v/v to 15% v/v, from 0.05% v/v to 12.5% v/v, from 0.05% v/v to 10% v/v, from 0.05% v/v to 7.5% v/v, from 0.05% v/v to 5% v/v, from 0.05% v/v to 2.5% v/v, from 0.05% v/v to 1% v/v, from 0.05% v/v to 0.75% v/v, from 0.05% v/v to 0.5% v/v, from 0.05% v/v to 0.25% v/v, from 0.05% v/v to 0.1% v/v, from 0.05% v/v to 0.075% v/v, from 0.1% v/v to 20% v/v, from 0.1% v/v to 17.5% v/v, from 0.1% v/v to 15% v/v, from 0.1% v/v to 12.5% v/v, from 0.1% v/v to 10% v/v, from 0.1% v/v to 7.5% v/v, from 0.1% v/v to 5% v/v, from 0.1% v/v to 2.5% v/v, from 0.1% v/v to 1% v/v, from 0.1% v/v to 0.75% v/v, from 0.1% v/v to 0.5% v/v, from 0.1% v/v to 0.25% v/v, from 0.5% v/v to 20% v/v, from 0.5% v/v to 17.5% v/v, from 0.5% v/v to 15% v/v, from 0.5 9% v/v to 12.5% v/v, from 0.5% v/v to 10% v/v, from 0.5% v/v to 7.5% v/v, from 0.5% v/v to 5% v/v, from 0.5% v/v to 2.5% v/v, from 0.5% v/v to 1% v/v, from 1% v/v to 20% v/v, from 1% v/v to 17.5% v/v, from 1% v/v to 15% v/v, from 1% v/v to 12.5% v/v, from 1% v/v to 10% v/v, from 1% v/v to 7.5% v/v, from 1% v/v to 5% v/v, from 1% v/v to 2.5% v/v, from 2.5% v/v to 20% v/v, from 2.5% v/v to 17.5% v/v, from 2.5% v/v to 15% v/v, from 2.5% v/v to 12.5% v/v, from 2.5% v/v to 10% v/v, from 2.5% v/v to 7.5% v/v, from 2.5% v/v to 5% v/v, from 5% v/v to 20% v/v, from 5% v/v to 17.5% v/v, from 5% v/v to 15% v/v, from 5% v/v to 12.5% v/v, from 5% v/v to 10% v/v, from 5% v/v to 7.5% v/v, from 7.5% v/v to 20% v/v, from 7.5% v/v to 17.5% v/v, from 7.5% v/v to 15% v/v, from 7.5% v/v to 12.5% v/v, from 7.5% v/v to 10% v/v, from 10% v/v to 20% v/v, from 10% v/v to 17.5% v/v, from 10% v/v to 15% v/v, from 10% v/v to 12.5% v/v, from 12.5% v/v to 20% v/v, from 12.5% v/v to 17.5% v/v, from 12.5% v/v to 15% v/v, from 15% v/v to 20% v/v, from 15% v/v to 17.5% v/v, from 17.5% v/v to 20% v/v). In some embodiments, the glycerol can be present in the breaking composition in a concentration of from 1% v/v to 3% v/v.

In some embodiments, the breaking composition can include from 15% v/v to 25% v/v (e.g., from 19% v/v to 23% v/v) sulfosuccinate, from 70% v/v to 80% v/v (e.g., from 73% v/v to 75% v/v) 4-methyl-2-pentanol, and from 0.5% v/v to 5% v/v (1% v/v to 3% v/v) glycerol.

In some embodiments, the breaking composition can further include one or more defoamers, demulsifiers, or any combination thereof.

In some embodiments, the breaking composition can further include one or more additional components, such as additional surfactant, a diluent, a polymer, a pH adjusting agent, a chelating agent, a corrosion inhibitor, a biocide, or any combination thereof.

Defoamer and Demulsifiers

Optionally, the composition can include one or more defoamers, one or more demulsifiers, or any combinations thereof. Defoamers and demulsifiers are known in the art. Examples of such materials include oil-based defoamers, water-based defoamers, silicone-based defoamers, alkyleneoxy-based defoamers, polyacrylate dofoamers, ketone-based defoamers, phenol-formaldehyde resins (acid-catalyzed phenol-formaldehyde resins, base-catalyzed phenol-formaldehyde resins), epoxy resins, polyamines (including polyamine polymers), polyols, di-epoxides, dendrimers, star polymers, zwitterionic surfactants, cationic surfactants, or any combination thereof.

In some embodiments, the breaking composition can comprise an oil-based defoamer. Oil based defoamers are known in the art, and include an oil carrier. The oil carrier can comprise, for example, mineral oil, vegetable oil, white oil or any other oil that is insoluble in the foaming medium (except silicone oil). Oil-based defoamers can further include a wax to improve defoaming performance. Typical waxes, include, for example, ethylene bis stearamide (EBS), paraffin waxes, ester waxes, and fatty alcohol waxes. These oil-based defoamers can also include surfactants to improve emulsification and spreading in the foaming medium.

In some embodiments, the breaking composition can comprise a water-based defoamer. Water-based defoamers are known in the art, and can include one or more oils, one or more waxes, or any combination thereof dispersed in an aqueous carrier. Examples of suitable oils include mineral oil or vegetable oils. Examples of suitable waxes include long chain fatty alcohols and fatty acid soaps or esters.

In some embodiments, the breaking composition can comprise a silicone-based defoamer. Silicone-based defoamers are known in the art, and can include, for example, a silicone polymer or oligomer (e.g., a polymer or oligomer with a silicon backbone). These might be delivered as an oil or a water-based emulsion. The silicone compound might also comprise a silicone glycol or other modified silicone fluids. In some embodiments, the silicone-based defoamer can a polydimethylsiloxane or derivative thereof. Fluorosilicones can also be used.

In some embodiments, the breaking composition can comprise an alkyleneoxy-based defoamer. Alkyleneoxy-based defoamers are known in the art, and can include polyalkylene oxides (e.g., polyethylene glycol, polypropylene glycol, polybutylene glycol, copolymers thereof, and blends thereof). These defoamers can be formulated in oil-based solutions, aqueous solutions, or water-based emulsions.

In some embodiments, the breaking composition can comprise a polyacrylate. Polyacrylates (alkyl polyacrylates) are often formulated in an organic solvent carrier (e.g., a petroleum distillate).

In some embodiments, the breaking composition can comprise a wax. The wax can include an oxidized polyethylene wax, a microcrystalline wax, a hydroxyl group-containing wax, a paraffin wax, a natural wax, a maleic acid modified wax, an ethylene-vinyl acetate copolymer wax, an ethylene-acrylic acid copolymer wax, a Fischer-Tropsch wax, a wood wax, beeswax, palm wax, carnauba wax, montan wax, or any combination thereof.

In some embodiments, the breaking composition can comprise a fatty acid diamide. The fatty acid diamide can comprise, for example, ethylene bisstearylamide, ethylene bispalmitylamide, ethylene bislaurylamide, methylene bisstearylamide, hexamethylene bisstearylamide, or any combination thereof.

In some embodiments, the breaking composition can comprise a metal soap. Metal soaps can comprise salts of fatty acids having 12 to 22 carbon atoms and metals (alkaline earth metals, aluminum, manganese, cobalt, copper, iron, zinc, nickel, etc.). Examples of metal soaps include aluminum stearate, manganese stearate, stearin, cobalt stearate, copper stearate, iron stearate, nickel stearate, calcium stearate, zinc laurate, magnesium behenate, or any combination thereof.

In some embodiments, the breaking composition can comprise one or more of the following: (1) polysiloxanes (silicones), such as polydimethylsiloxanes (e.g., $(CH_3)_3SiO[SiO(CH_3)_2]_nSi(CH_3)_3$), decamethylpentasiloxane, organo-modified silicones, octamethylcyclotetrasiloxane, silicone polyalkyleneoxides, silicone glycols, polydimethylsiloxanes, silicone co-polymers, trimethylsiloxy-terminated polydimethylsiloxanes, trimethylsiloxy-terminated trifluoropropylmethylsiloxane, alkylaryl siloxanes, polyether modified polysiloxanes, etc.; (2) ethoxylates, such as octylphenol ethoxylate, nonylphenol ethoxylate, alcohol ethoxylates, etc.; (3) wax-based compounds, such as N,N'-bisstearoylethylendiamine, synthetic wax/mineral oil blends, sorbitan trioleate, etc.; (4) fluoro-substituted compounds, such as fluorosilicones, fluorinated alcohols, fluoroalkyl alcohol substituted polyethylenes, fluorinated substituted urethanes, perfluoroalkyl methacrylic copolymers, perfluoroalkyl polyurethanes, perfluorobutylethylene, perfluorohexylethyl alcohols, perfluorohexane, perfluorooctane, perfluorohexylethyl methacrylate, polyfluorosulfonic acids, fluoroglycols, fluoroalcohol glycols, perfluoroalkyl methacrylate copolymers, perfluoroalkylsulfonic acid, fluorinated acrylic copolymers, fluoroethoxylates, etc.; (5) polymers, such as polyethers, alkyl copolymers, alkyl polyglucocides, ethylene oxide copolymers, propylene oxide copolymers, polyalkyleneglycols, polyether polyols, phosphate polyether esters, polyethylene glycol copolymers, polypropylene glycol copolymers, polyacrylates, polypropylenes, etc., (6) mineral oils, such as activated white oils, paraffin-based mineral oils, etc.; (7) surfactant-type compounds, such as methacrylated mono- and di-phosphate esters, trialkyl phosphate esters, fatty acids, propoxylated/ethoxylated alcohols, alkoxylated secondary alcohols (e.g., ethoxylated C11-C15 secondary alcohols) etc.; (8) sulphur-based compounds, such as polyether sulfates, alkoxylate sulfates, dioctyl sulfosuccinate, alkyldiphenyloxide disulfonate, etc.; (9) succinates; (10) seed oil based defoamers; (11) long chain chlorinated alkanes, including C20+ chlorinated alkanes; (12) cellulose ethers, such as methyl cellulose; (13) ketones, such as methyl isobutyl ketone; or any combination thereof.

In certain embodiments, the breaking composition can comprise an oligo- and/or polysiloxane (silicone), such as a polydimethylsiloxane (e.g., $(CH_3)_3SiO[SiO(CH_3)_2]_nSi(CH_3)_3$), decamethylpentasiloxane, an organo-modified silicone, octamethylcyclotetrasiloxane, a silicone polyalkyleneoxide, a silicone glycol, a silicone co-polymer, a fluorosiloxane (e.g., trifluoropropylmethylsiloxane), a trimethylsiloxy-terminated polydimethylsiloxane, a trimethylsiloxy-terminated trifluoropropylmethylsiloxane, a alkylaryl siloxane, a polyether-modified polysiloxane, or any combination thereof. In one example, the breaking composition can comprise octamethylcyclotetrasiloxane. In one example, the breaking composition can comprise a polydimethylsiloxane.

In certain embodiments, the breaking composition can comprise a ketone, such as methyl isobutyl ketone.

In certain embodiments, the breaking composition can comprise a cellulose ether, such as methyl cellulose.

In certain embodiments, the breaking composition can comprise a propoxylated/ethoxylated alcohol.

Additional Components

Optionally, the breaking composition can include one or more additional components. Examples of suitable additional components include, but are not limited to, one or more additional surfactants, a diluent, a polymer, a pH adjusting agent, a chelating agent (e.g., EDTA or a salt thereof), a corrosion inhibitor, a biocide, or any combination thereof.

In certain embodiments, the breaking composition can comprise a diluent, such as water, methanol, hydrocarbon solvent (light aromatic naptha, xylene, heptane, octane, etc.), or any combination thereof.

In some embodiments, the breaking composition can comprise one or more additional surfactants. The one or more additional surfactants can comprise one or more anionic surfactants, one or more non-ionic surfactants, one or more cationic surfactants, one or more zwitterionic surfactants, or any combination thereof. In some embodiments, the one or more additional surfactants can comprise a primary surfactant and optionally one or more secondary surfactants. In some embodiments, the primary surfactant can comprise an anionic surfactant, and the optional one or more secondary surfactants can be selected from an anionic surfactant, a cationic surfactant, a zwitterionic surfactant, an amphoteric surfactant, a non-ionic surfactant, or any combination thereof. In some embodiments, the primary surfactant can comprise a non-ionic surfactant, and the optional one or more secondary surfactants can be selected from an anionic surfactant, a cationic surfactant, a zwitterionic surfactant, an amphoteric surfactant, a non-ionic surfactant, or any combination thereof.

Examples of anionic surfactants that may be present as a primary surfactant and/or a secondary surfactant include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS) other than the olefin sulfonates described herein, an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di) sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —COO— or acid or salt thereof including metal cations such as sodium. In embodiments, the alkoxy carboxylate surfactant can be defined by the formulae below:

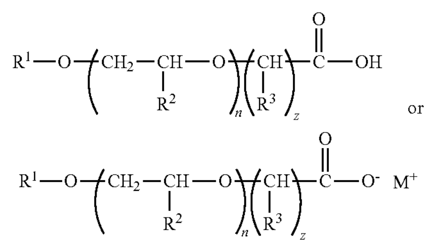

wherein $R^1$ is substituted or unsubstituted $C_6$-$C_{36}$ alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—$CH_2$—CH(methyl)-O-linkers), attached in turn to from 0 to 100 ethyleneoxy groups (—$CH_2$—$CH_2$—O-linkers), attached in turn to —COO or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3$— or acid or salt thereof including metal cations such as sodium. In some embodiment, the alkoxy sulfate surfactant has the formula R—$(BO)_e$—$(PO)_f$-$(EO)_g$—$SO_3^-$ or acid or salt (including metal cations such as sodium) thereof, wherein R is C6-C32 alkyl, BO is —$CH_2$—CH(ethyl)-O—, PO is —$CH_2$—CH (methyl)-O—, and EO is —$CH_2$—$CH_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —$SO_3^-$ or acid or salt thereof including metal cations such as sodium.

An "aryl sulfate surfactant" or "aryl sulfate" refers to a compound having an aryl group attached to —O—$SO_3$; or acid or salt thereof including metal cations such as sodium. An "aryl sulfonate surfactant" or "aryl sulfonate" refers to a compound having an aryl group attached to — $SO_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" in the context of co-surfactants present in addition to the olefin sulfonates described herein refers to an unsaturated hydrocarbon compound comprising at least one carbon-carbon double bond and at least one $SO_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to surfactant packages described herein when used for LPS injection fluids intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disufonate. In embodiments, the anionic surfactant can be benzenesulfonic acid, decyl(sulfophenoxy)-disodium salt; linear or branched C6-C36 alkyl:PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, the anionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di) sulfonate.

In some examples, the anionic surfactant can comprise a surfactant defined by the formula below:

$R^1$-$R^2$-$R^3$ wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups.

In some examples, the anionic surfactant can comprise a surfactant defined by the formula below:

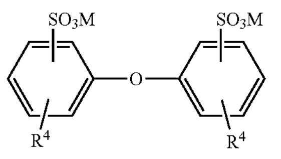

wherein $R^4$ is, independently for each occurrence, a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

In some embodiments, non-ionic surfactants may be present as the primary surfactant and/or secondary surfactant. Example non-ionic surfactants include compounds that can be added to increase wettability. In some embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO: 5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11:9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32:PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464; WIPO Patent Application Nos. WO/2008/079855, WO/2012/027757 and WO/2011/094442; as well as U.S. Patent Application Publication Nos. 2005/0199395, 2006/0185845, 2006/0189486, 2009/0270281, 2011/0046024, 2011/0100402, 2011/0190175, 2007/0191633, 2010/004843, 2011/0201531, 2011/0190174, 2011/0071057, 2011/0059873, 2011/0059872, 2011/0048721, 2010/0319920, 2010/0292110, and 2017/0198202, and U.S. patent application Ser. Nos. 16/922,999, 16/922,993, 16/922,997, 16/923,000 each of which is hereby incorporated by reference herein in its entirety for its description of example surfactants.

Produced Fluid

In some embodiments, the foam, emulsion, or any combination thereof can comprise produced fluid (fluid produced from a hydrocarbon-bearing formation). The produced fluid can comprise an aqueous component (water, brine, etc.), a hydrocarbon component (e.g., crude oil), and one or more surfactants described herein.

In some embodiments, the produced fluid can comprise fluid produced following injection of an aqueous composition into a formation. The aqueous composition can comprise, for example, an injection fluid introduced into the formation as part of an enhanced oil recovery (EOR) operation. Examples of EOR operations include, for example, chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), a stimulation operation (e.g., a surfactant stimulation operation), microbial injection, and thermal recovery (which includes, for example, cyclic steam, steam flooding, and fire flooding). In some embodiments, the EOR operation can include an alkaline (A) flooding operation, a polymer (P) flooding operation, an alkaline-polymer (AP) flooding operation, a surfactant-polymer (SP) flooding operation, an alkaline-surfactant-polymer (ASP) flooding operation, a conformance control operation, a stimulation operation, or any combination thereof. In other examples, the aqueous composition can comprise a fracturing fluid. In other examples, the aqueous composition can comprise a composition injected for wellbore/near-wellbore cleanup operations. In these embodiments, the aqueous component of the produced fluid can include one or more components of the injection fluid.

The water used to form the compositions can include any type of water, treated or untreated, and can vary in salt content. For example, the aqueous solution can include sea water, brackish water, flowback or produced water, wastewater (e.g., reclaimed or recycled), brine (e.g., reservoir or synthetic brine), fresh water (e.g., fresh water comprises <1,000 ppm TDS water), or any combination thereof. In certain examples, the water can include hard water or hard brine. In some embodiments, the water can include at least 10 ppm of divalent metal ions (e.g., at least 100 ppm, at least 500 ppm, at least 1,000 ppm, at least 5,000 ppm, at least 10,000 ppm, at least 20,000 ppm, or at least 30,000 ppm). In some embodiments, the water can include 30,000 ppm or less of divalent metal ions (e.g., 20,000 ppm or less, 10,000 ppm or less, 5,000 ppm or less, 1,000 ppm or less, 500 ppm or less, 100 ppm or less, or 50 ppm or less). In certain embodiments, the from 10 ppm to 30,000 ppm of divalent metal ions.

The water can have a concentration of divalent metal ions ranging from any of the minimum values described above to any of the maximum values described above. For example, in some embodiments, the water can include from 10 ppm to 30,000 ppm of divalent metal ions (e.g., from 50 ppm to 30,000 ppm, from 100 ppm to 30,000 ppm, from 500 ppm to 30,000 ppm, from 1000 ppm to 30,000 ppm, from 5000 ppm to 30,000 ppm, from 10,000 ppm to 30,000 ppm, from 20,000 ppm to 30,000 ppm, from 10 ppm to 20,000 ppm, from 50 ppm to 20,000 ppm, from 100 ppm to 20,000 ppm, from 500 ppm to 20,000 ppm, from 1000 ppm to 20,000 ppm, from 5000 ppm to 20,000 ppm, from 10,000 ppm to 20,000 ppm, from 10 ppm to 10,000 ppm, from 50 ppm to 10,000 ppm, from 100 ppm to 10,000 ppm, from 500 ppm to 10,000 ppm, from 1000 ppm to 10,000 ppm, from 5000 ppm to 10,000 ppm, from 10 ppm to 5,000 ppm, from 50 ppm to 5,000 ppm, from 100 ppm to 5,000 ppm, from 500 ppm to 5,000 ppm, from 1000 ppm to 5,000 ppm, from 10 ppm to 1,000 ppm, from 50 ppm to 1,000 ppm, from 100 ppm to 20,000 ppm, from 500 ppm to 1,000 ppm, from 10 ppm to 500 ppm, from 50 ppm to 500 ppm, from 100 ppm to 500 ppm, from 10 ppm to 100 ppm, from 50 ppm to 100 ppm, or from 10 ppm to 50 ppm). In some embodiments, the divalent metal ions can be chosen from $Ca^{2+}$, $Mg^{2+}$, $Sr^{2+}$, and $Ba^{2+}$, or any combination thereof.

The produced fluid can further include one or more surfactants described herein. The one or more surfactants can comprise one or more surfactants injected into the reservoir as part of an oil recovery application, one or more surfactants produced in situ within the reservoir (e.g., from reaction of an active oil), or any combination thereof.

In some embodiments, the one or more surfactants can comprise a surfactant package (e.g., a surfactant package that was injected into the reservoir as part of an oil and gas operation and then produced (along with an aqueous fluid and hydrocarbons), either from the same well into which the surfactant package was injected or from a nearby production well in fluid communication with the well into the surfactant package was injected.

In some embodiments, the surfactant package can comprise a primary surfactant and optionally one or more secondary surfactants, where at least one of the surfactants. In some embodiments, the primary surfactant can comprise an anionic surfactant, and the optional one or more secondary surfactants can be selected from an anionic surfactant, a cationic surfactant, a zwitterionic surfactant, an amphoteric surfactant, a non-ionic surfactant, or any combination thereof described herein. In some embodiments, the primary surfactant can comprise a non-ionic surfactant, and the optional one or more secondary surfactants can be selected from an anionic surfactant, a cationic surfactant, a zwitterionic surfactant, an amphoteric surfactant, a non-ionic surfactant, or any combination thereof described herein.

Examples of anionic surfactants that may be present as a primary surfactant and/or a secondary surfactant include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS) other than the olefin sulfonates described herein, an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di) sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —COO or acid or salt thereof including metal cations such as sodium. In embodiments, the alkoxy carboxylate surfactant can be defined by the formulae below:

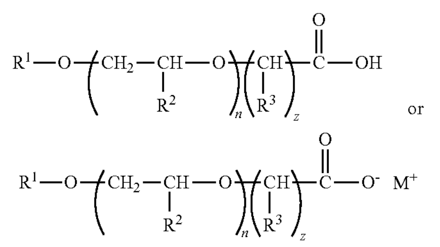

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—$CH_2$—CH(methyl)-O-linkers), attached in turn to from 0 to 100 ethyleneoxy groups (—$CH_2$—$CH_2$—O-linkers), attached in turn to —$COO^-$ or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkoxy sulfate surfactant has the formula R—$(BO)_e$—$(PO)_f$-$(EO)_g$—$SO_3^-$ or acid or salt (including metal cations such as sodium) thereof, wherein R is C6-C32 alkyl, BO is —$CH_2$—CH(ethyl)-O—, PO is —$CH_2$—CH(methyl)-O—, and EO is —$CH_2$—$CH_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —$SO_3$— or acid or salt thereof including metal cations such as sodium.

An "aryl sulfate surfactant" or "aryl sulfate" refers to a compound having an aryl group attached to —O—$SO_3^-$ or acid or salt thereof including metal cations such as sodium. An "aryl sulfonate surfactant" or "aryl sulfonate" refers to a compound having an aryl group attached to —$SO_3$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" in the context of co-surfactants present in addition to the olefin sulfonates described herein refers to an unsaturated hydrocarbon compound comprising at least one carbon-carbon double bond and at least one $SO_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to surfactant packages described herein when used for LPS injection fluids intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disufonate. In embodiments, the anionic surfactant can be benzenesulfonic acid, decyl(sulfophenoxy)-disodium salt; linear or branched C6-C36 alkyl:PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, the anionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di) sulfonate.

In some examples, the anionic surfactant can comprise a surfactant defined by the formula below:

$R^1$-$R^2$-$R^3$ wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups.

In some examples, the anionic surfactant can comprise a surfactant defined by the formula below:

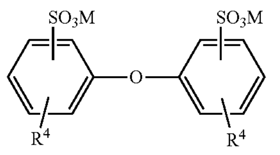

wherein $R^4$ is, independently for each occurrence, a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

In some embodiments, non-ionic surfactants may be present as the primary surfactant and/or secondary surfactant. Example non-ionic surfactants include compounds that can be added to increase wettability. In some embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1- 100 repeating units of EO are present. In some embodiments, 0-65 repeating units of PO are present. In some embodiments, 0-25 repeating units of BO are present. For example, the non-ionic surfactant could comprise 10EO: 5PO or 5EO. In embodiments, the non-ionic surfactant may be a mix of surfactants with different length lipophilic tail chain lengths. For example, the non-ionic surfactant may be C9-C11: PO9: EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11: 9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32: PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464; WIPO Patent Application Nos. WO/2008/079855, WO/2012/027757 and WO/2011/094442; as well as U.S. Patent Application Publication Nos. 2005/0199395, 2006/0185845, 2006/0189486, 2009/0270281, 2011/0046024, 2011/0100402, 2011/0190175, 2007/0191633, 2010/004843, 2011/0201531, 2011/0190174, 2011/0071057, 2011/0059873, 2011/0059872, 2011/0048721, 2010/0319920, 2010/0292110, and 2017/0198202, and U.S. patent application Ser. Nos. 16/922,999, 16/922,993, 16/922,997, 16/923,000 each of which is hereby incorporated by reference herein in its entirety for its description of example surfactants.

In certain examples, the produced fluid can include a mixture of surfactants, hydrocarbons, and aqueous fluid produced following treatment with a composition in the table below.

| Injection Fluid | Surfactants and Co-Surfactants (in weight percent) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 6 | 0.2% alkoxylated C6-C16 alcohol<br>0.033% carboxylate<br>0.066% disulfonate |
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate<br>0.05% alkyl polyglucoside |
| 9 | 0.1% alkoxylated C6-C16 alcohol<br>0.05% carboxylate<br>0.05% olefin sulfonate<br>0.1% alkyl polyglucoside |
| 10 | 0.15% alkoxylated C6-C16 alcohol<br>0.07% carboxylate<br>0.03% olefin sulfonate<br>0.1% alkyl polyglucoside |
| 11 | 0.1% alkoxylated C6-C16 alcohol<br>0.04% carboxylate<br>0.05% olefin sulfonate<br>0.03% disulfonate<br>0.1% alkyl polyglucoside |
| 12 | 0.1% alkoxylated C6-C16 alcohol<br>0.04% carboxylate<br>0.06% disulfonate<br>0.1% alkyl polyglucoside |
| 13 | 0.15% alkoxylated C6-C16 alcohol<br>0.15% alkoxylated alkylphenol<br>0.1% olefin sulfonate<br>0.1% Guerbet alkoxylated carboxylate |
| 14 | 0.125% alkoxylated C6-C16 alcohol<br>0.175% alkoxylated alkylphenol<br>0.1% olefin sulfonate<br>0.1% Guerbet alkoxylated carboxylate |
| 15 | 0.1% alkoxylated C6-C16 alcohol<br>0.2% alkoxylated alkylphenol<br>0.1% olefin sulfonate<br>0.1% Guerbet alkoxylated carboxylate |
| 16 | 0.12% alkoxylated C6-C16 alcohol<br>0.22% alkoxylated alkylphenol<br>0.08% olefin sulfonate<br>0.08% Guerbet alkoxylated carboxylate |
| 17 | 0.15% alkoxylated C6-C16 alcohol<br>0.15% alkoxylated alkylphenol<br>0.08% olefin sulfonate<br>0.06% Guerbet alkoxylated carboxylate<br>0.06% carboxylate |
| 18 | 0.15% alkoxylated C6-C16 alcohol<br>0.15% alkoxylated alkylphenol<br>0.05% olefin sulfonate<br>0.1% Guerbet alkoxylated carboxylate<br>0.05% disulfonate |
| 19 | 0.5% olefin sulfonate<br>0.5% Guerbet alkoxylated carboxylate<br>0.55% glycosides or glucosides |
| 20 | 0.5% olefin sulfonate<br>0.5% Guerbet alkoxylated carboxylate<br>0.5% glycosides or glucosides<br>0.25% alkoxylated C6-C16 alcohol |
| 21 | 0.5% olefin sulfonate<br>0.5% Guerbet alkoxylated carboxylate<br>0.5% glycosides or glucosides<br>0.5% alkoxylated C6-C16 alcohol |
| 22 | 0.5% olefin sulfonate<br>0.5% Guerbet alkoxylated carboxylate<br>1% glycosides or glucosides<br>0.5% alkoxylated C6-C16 alcohol |
| 23 | 0.05% olefin sulfonate<br>0.05% Guerbet alkoxylated carboxylate<br>0.05% glycosides or glucosides<br>0.05% alkoxylated C6-C16 alcohol |
| 24 | 0.075% glycosides or glucosides<br>0.075% alkoxylated C6-C16 alcohol |
| 25 | 0.1% alkoxylated C6-C16 alcohol<br>0.05% disulfonate |

-continued

| Injection Fluid | Surfactants and Co-Surfactants (in weight percent) |
|---|---|
| 26 | 0.1% alkoxylated C6-C16 alcohol<br>0.05% disulfonate<br>0.03% hydroxyalkyl alkylammonium chloride |
| 27 | 0.03% olefin sulfonate<br>0.04% Guerbet alkoxylated carboxylate<br>0.08% glycosides or glucosides<br>0.05% alkoxylated C6-C16 alcohol |
| 28 | 0.4% olefin sulfonate<br>0.4% Guerbet alkoxylated carboxylate<br>0.7% glycosides or glucosides<br>0.5% alkoxylated C6-C16 alcohol |
| 29 | 0.05% olefin sulfonate<br>0.1% glycosides or glucosides<br>0.05% alkoxylated C6-C16 alcohol |
| 30 | 0.05% olefin sulfonate<br>0.1% alkyl polyglucoside<br>0.05% alkoxylated C6-C16 alcohol |
| 31 | 0.05% olefin sulfonate<br>0.1% glycosides or glucosides<br>0.05% alkoxylated C6-C16 alcohol |
| 32 | 0.05% olefin sulfonate<br>0.1% alkyl polyglucoside<br>0.05% alkoxylated C6-C16 alcohol |
| 33 | 0.05% olefin sulfonate<br>0.1% alkyl polyglucoside<br>0.05% alkoxylated C6-C16 alcohol |
| 34 | 0.05% olefin sulfonate<br>0.05% glycosides or glucosides<br>0.05% alkoxylated C6-C16 alcohol<br>0.05% carboxylate |
| 35 | 0.05% olefin sulfonate<br>0.05% glycosides or glucosides<br>0.05% alkoxylated C6-C16 alcohol<br>0.05% carboxylate |
| 36 | 0.05% olefin sulfonate<br>0.05% alkyl polyglucoside<br>0.05% alkoxylated C6-C16 alcohol |
| 37 | 0.06% olefin sulfonate<br>0.05% alkyl polyglucoside<br>0.04% alkoxylated C6-C16 alcohol |
| 38 | 0.04% olefin sulfonate<br>0.08% glycosides or glucosides<br>0.05% alkoxylated C6-C16 alcohol<br>0.03% disulfonate |
| 39 | 0.035% olefin sulfonate<br>0.075% glycosides or glucosides<br>0.05% alkoxylated C6-C16 alcohol<br>0.04% disulfonate |
| 40 | 0.035% olefin sulfonate<br>0.07% glycosides or glucosides<br>0.045% alkoxylated C6-C16 alcohol<br>0.05% disulfonate |
| 41 | 0.1% alkoxylated C6-C16 alcohol<br>0.1% disulfonate |
| 42 | 0.25% Guerbet alkoxylated carboxylate<br>0.25% olefin sulfonate<br>0.5% glycosides or glucosides<br>0.5% co-solvent |
| 43 | 0.075% alkoxylated C12-C22 alcohol<br>0.075% disulfonate |
| 44 | 0.075% alkoxylated C6-C16 Guerbet alcohol<br>0.075% disulfonate |
| 45 | 0.075% alkoxylated C6-C16 Guerbet alcohol<br>0.075% disulfonate |
| 46 | 0.075% alkoxylated C6-C16 alcohol<br>0.075% disulfonate |
| 47 | 0.075% disulfonate<br>0.075% alkoxylated C6-C16 alcohol |
| 48 | 0.0625% disulfonate<br>0.0875% alkoxylated C6-C16 alcohol |
| 49 | 0.055% disulfonate<br>0.095% alkoxylated C6-C16 alcohol |
| 50 | 0.075% disulfonate<br>0.075% alkoxylated C6-C16 alcohol |
| 51 | 1% alkoxylated C6-C16 alcohol<br>0.5% disulfonate |

-continued

| Injection Fluid | Surfactants and Co-Surfactants (in weight percent) |
|---|---|
| 52 | 1% alkoxylated C6-C16 alcohol |
| 53 | 1% alkoxylated C6-C16 alcohol<br>2.25% sulfosuccinate |
| 54 | 0.25% Guerbet alkoxylated carboxylate<br>1% alkoxylated C6-C16 alcohol<br>2.25% sulfosuccinate |
| 55 | 0.25% Guerbet alkoxylated carboxylate<br>1% alkoxylated alkylphenol<br>2.25% sulfosuccinate |
| 56 | 0.25% Guerbet alkoxylated carboxylate<br>1% alkoxylated C6-C16 alcohol |
| 57 | 0.25 Guerbet alkoxylated carboxylate<br>1% alkoxylated alkylphenol |
| 58 | 0.65% carboxylate<br>0.35% alkoxylated C6-C16 alcohol |
| 59 | 0.325% carboxylate<br>0.925% alkoxylated C6-C16 alcohol |
| 60 | 0.25% olefin sulfonate<br>1.0% alkoxylated C6-C16 alcohol |
| 61 | 0.15% olefin sulfonate<br>0.2% Guerbet alkoxylated carboxylate<br>0.92% carboxylate |
| 62 | 0.65% carboxylate<br>0.35% second carboxylate |
| 63 | 0.65% carboxylate<br>0.35% alkoxylated C6-C16 alcohol<br>1% olefin sulfonate |
| 64 | 1% alkoxylated alcohol<br>1% olefin sulfonate |
| 65 | 0.5% alkoxylated alcohol<br>0.5% olefin sulfonate<br>0.25% carboxylate |
| 66 | 0.6% co-solvent<br>0.6% olefin sulfonate |
| 67 | 0.6% co-solvent<br>0.3% disulfonate<br>0.3% olefin sulfonate |
| 68 | 0.6% Guerbet alkoxylated carboxylate<br>0.6% disulfonate |
| 69 | 0.6% co-solvent<br>0.4% disulfonate<br>0.2% olefin sulfonate |
| 70 | 0.5% alkoxylated C6-C16 alcohol<br>0.4% disulfonate<br>0.3% olefin sulfonate |
| 71 | 1% alkoxylated C6-C16 alcohol |
| 72 | 0.9% alkoxylated C6-C16 alcohol<br>0.6% disulfonate |
| 73 | 0.4% alkoxylated C6-C16 alcohol<br>0.35% disulfonate<br>0.25% olefin sulfonate<br>0.5% co-solvent |
| 74 | 0.25% Guerbet alkoxylated carboxylate<br>0.5% alkoxylated C6-C16 alcohol<br>0.35% disulfonate<br>0.15% olefin sulfonate<br>0.35% co-solvent |
| 75 | 0.25% Guerbet alkoxylated carboxylate<br>0.25% alkoxylated C6-C16 alcohol<br>0.25% olefin sulfonate<br>0.25% co-solvent |
| 76 | 0.25% Guerbet alkoxylated carboxylate<br>0.25% alkoxylated C6-C16 alcohol<br>0.25% olefin sulfonate<br>0.25% alkoxylated alcohol |
| 77 | 0.25% Guerbet alkoxylated carboxylate<br>0.35% olefin sulfonate<br>0.5% alkoxylated alcohol |
| 78 | 0.25% Guerbet alkoxylated carboxylate<br>0.25% alkoxylated C6-C16 alcohol<br>0.15% olefin sulfonate<br>0.1% disulfonate<br>0.25% co-solvent |
| 79 | 0.25% Guerbet alkoxylated carboxylate<br>0.25% alkoxylated C6-C16 alcohol<br>0.25% olefin sulfonate |

-continued

| Injection Fluid | Surfactants and Co-Surfactants (in weight percent) |
|---|---|
| | 0.25% glycosides or glucosides<br>0.25% co-solvent<br>0.15% disulfonate |
| 80 | 0.25% Guerbet alkoxylated carboxylate<br>0.25% olefin sulfonate<br>0.5% glycosides or glucosides<br>0.25% co-solvent |
| 81 | 0.15% alkoxylated C12-C22 alcohol |
| 82 | 0.075% alkoxylated C12-C22 alcohol<br>0.075% disulfonate |
| 83 | 0.075% alkoxylated C12-C22 alcohol<br>0.075% disulfonate |
| 84 | 0.075% alkoxylated C12-C22 alcohol<br>0.075% alkoxylated C6-C16 Guerbet alcohol |
| 85 | 0.15% alkoxylated C6-C16 Guerbet alcohol |
| 86 | 0.075% alkoxylated C6-C16 Guerbet alcohol<br>0.075% disulfonate |
| 87 | 0.075% alkoxylated C6-C16 Guerbet alcohol<br>0.075% disulfonate<br>0.05% co-solvent |
| 88 | 0.1% alkoxylated C6-C16 alcohol<br>0.05% disulfonate |
| 89 | 1% alkoxylated C6-C16 alcohol<br>0.5% disulfonate |
| 90 | 0.075% alkoxylated C6-C16 Guerbet alcohol<br>0.075% disulfonate |
| 91 | 0.075% alkoxylated C6-C16 Guerbet alcohol<br>0.125% disulfonate |
| 92 | 0.075% alkoxylated C12-C22 alcohol<br>0.125% disulfonate |
| 93 | 0.075% alkoxylated C12-C22 alcohol<br>0.075% disulfonate |
| 94 | 0.075% alkoxylated C6-C16 Guerbet alcohol<br>0.075% disulfonate |
| 95 | 0.1% alkoxylated C6-C16 Guerbet alcohol<br>0.05% disulfonate |
| 96 | 0.075% alkoxylated C6-C16 Guerbet alcohol<br>0.075% disulfonate |
| 97 | 0.075% alkoxylated C6-C16 alcohol<br>0.075% disulfonate |
| 98 | 0.075% alkoxylated C6-C16 Guerbet alcohol<br>0.075% disulfonate |
| 99 | 0.1% alkoxylated C6-C16 alcohol<br>0.05% disulfonate |
| 100 | 0.09% alkoxylated C6-C16 alcohol<br>0.06% disulfonate |
| 101 | 0.1% alkoxylated C6-C16 alcohol<br>0.1% disulfonate<br>0.1% Guerbet alkoxylated carboxylate |
| 102 | 0.1% alkoxylated C6-C16 alcohol<br>0.1% disulfonate |
| 103 | 0.65% Guerbet alkoxylated carboxylate<br>0.35% olefin sulfonate<br>0.33% alkoxylated alkylphenol<br>0.5% co-solvent<br>0.25% second co-solvent |
| 104 | 0.075% alkoxylated C6-C16 alcohol<br>0.075% benzenesulfonic acid, decyl(sulfophenoxy)-disodium salt |
| 105 | 0.15% alkoxylated C6-C16 alcohol<br>0.05% benzenesulfonic acid, decyl(sulfophenoxy)-disodium salt |

Methods

Described herein are also methods for breaking a foam, emulsion, or any combination thereof. The methods can include contacting the foam, emulsion, or any combination thereof with a breaking composition described herein. In some embodiments, the method can reduce foam by at least 50%, such as from 50% to 100%, 50% to 60%, 50% to 70%, 50% to 80%, 50% to 90%, from 60% to 100%, from 60% to 70%, from 60% to 80%, from 60% to 90%, from 70% to 100%, from 70% to 80%, from 70% to 90%, from 80% to 90%, from 80% to 100%, or from 90% to 100%.

In some embodiments, the foam, emulsion, or any combination thereof can be formed during an oil and gas operation. In certain embodiments, the foam, emulsion, or any combination thereof can include produced fluid (as discussed in more detail below) produced during an oil and gas operation. In certain embodiments, the produced fluid can include both a foam and an emulsion.

The emulsion can include a microemulsion. In some embodiments, the emulsion can include a Winsor Type I microemulsion. In a Winsor Type I emulsion, a surfactant forms an oil-in-water microemulsion in the aqueous phase. In some embodiments, the emulsion can include a Winsor Type II microemulsion. In a Winsor Type II system, a surfactant forms a water-in-oil emulsion in the oil phase. In some embodiments, the emulsion can include a Winsor Type III microemulsion. In a Winsor Type III system, a surfactant forms a microemulsion in a separate phase between the oil and aqueous phases. This phase can be, for example, a continuous layer containing surfactant, water, and dissolved hydrocarbons.

In some embodiments, the foam, emulsion, or any combination thereof can be present within equipment associated with an oil and gas operation. For example, the foam, emulsion, or any combination thereof can be present within a vessel, pipeline, holding tank, separator, pipe, wellbore, wellhead, or any combination thereof. In these embodiments, contacting the foam, the emulsion, or any combination thereof with the breaking composition can include pumping, injecting, pouring, releasing, displacing, spotting or circulating the breaking composition into the vessel, the pipeline, the holding tank, the separator, the pipe, the wellbore, the wellhead, or any combination thereof.

In certain embodiments, the foam, emulsion, or any combination can be present in a pipe, a pipeline, wellhead, wellbore, or any combination thereof. In some of these embodiments, the methods for breaking the foam, the emulsion, or any combination thereof can comprise injecting the breaking composition into the pipe, the pipeline, the wellhead, the wellbore, or any combination thereof. The breaking composition can be injected into the pipe, the pipeline, the wellhead, the wellbore, or any combination thereof continuously. In other embodiments, the breaking composition can be injected into the pipe, the pipeline, the wellhead, the wellbore, or any combination thereof in one or more discrete injections.

In certain embodiments, the foam, emulsion, or any combination can be present in a holding tank, a separator, or any combination thereof. In some of these embodiments, the methods for breaking the foam, the emulsion, or any combination thereof can include injecting the breaking composition into the holding tank, the separator, or any combination thereof. In some of these embodiments, the methods for breaking the foam, the emulsion, or any combination thereof can comprise injecting the breaking composition upstream of the holding tank, upstream of the separator, or any combination thereof. In some of these embodiments, the methods for breaking the foam, the emulsion, or any combination thereof can comprise injecting the breaking composition downstream of the holding tank, downstream of the separator, or any combination thereof. The breaking composition can be injected continuously. In other embodiments, the breaking composition can be injected in one or more discrete injections.

In some embodiments, the breaking composition is combined with the foam, the emulsion, or any combination thereof at varying concentrations. In some embodiments, the breaking composition is combined with the foam, the emulsion, or any combination thereof at a concentration of 0.01% by volume or more (e.g., 0.05% by volume or more, 0.1% by volume or more, 0.5% by volume or more, 1% by volume or more, 2% by volume or more, 3% by volume or more, or 4% by volume or more). In some embodiments, breaking composition is combined with the foam, the emulsion, or any combination thereof at a concentration of 5% by volume or less (e.g., 4% by volume or less, 3% by volume or less, 2% by volume or less, 1% by volume or less, 0.5% by volume or less, 0.1% by volume or less, or 0.05% by volume).

In some embodiments, the breaking composition is combined with the foam, the emulsion, or any combination thereof at a concentration that can range from any of the minimum values described above to any of the maximum values described above. For example, the breaking composition is combined with the foam, the emulsion, or any combination thereof at a concentration from 0.01% to 5% by volume (e.g., from 0.01% to 2% by volume, from 0.01% to 1% by volume, from 0.01% to 0.5% by volume, from 0.05% to 5% by volume, from 0.05% to 2% by volume, from 0.05% to 1% by volume, from 0.05% to 0.5% by volume, from 0.1% to 5% by volume, from 0.1% to 2% by volume, from 0.1% to 1% by volume, or from 0.1% to 0.5% by volume.

Also provided are methods for hydrocarbon recovery that include producing fluids from a conventional or unconventional formation through a wellbore, wherein the produced fluids comprise a foam, an emulsion, or any combination thereof; contacting the produced fluids comprising the foam, the emulsion, or any combination thereof with a breaking composition described herein; and separating a hydrocarbon phase from the foam, the emulsion, or any combination thereof. In some embodiments, the method can further include preparing the breaking composition, and injecting the breaking composition.

In some embodiments, the methods include producing fluids from a conventional formation through a wellbore. In some embodiments, the methods include producing fluids from a unconventional formation through a wellbore.

In some embodiments, the breaking composition can be injected into a vessel, a pipeline, a holding tank, a separator, a pipe, a wellbore, a wellhead, or any combination thereof. Breaking can occur within the vessel, the pipeline, the holding tank, the separator, the pipe, the wellbore, the wellhead, or any combination thereof.

The breaking composition can be allowed to contact the produced fluid for varying periods of time depending on the produced fluid. In some embodiments, the breaking composition can be allowed to mix with the produced fluid for 1 second or more, (e.g., 30 seconds or more, 1 minute or more, 5 minutes or more, 10 minutes or more, 15 minutes or more, 30 minutes or more, or 45 minutes or more). In some embodiments, the breaking composition can be allowed to mix with the produced fluid for 60 minutes or less, (e.g., 45 minutes or less, 30 minutes or less, 15 minutes or less, 10 minutes or less, 5 minutes or less, 1 minute or less, 30 seconds or less).

In some embodiments, the breaking composition can be allowed to mix with the produced fluid for from any of the minimum values described above to any of the maximum values described above. For example, the breaking composition can be allowed to mix with the produced fluid for from 1 second to 60 minutes, from 30 seconds to 60 minutes, from 1 minute to 60 minutes, from 5 minutes to 60 minutes, from 10 minutes to 60 minutes, from 15 minutes to 60 minutes, from 30 minutes to 60 minutes, from 45 minutes to 60 minutes, from 1 minute to 30 minutes, from 1 minute to 15 minutes, from 1 minute to 5 minutes, from 5 minutes to 30 minutes, or from 10 minutes to 30 minutes.

In some embodiments, the method reduces foam by (exhibits a foam reduction potential of) at least 50%, (e.g., at least 55%, at least 60%, at least 65%, at least 70%, at least 75%, at least 80%, at least 85%, at least 90%, or at least 95%). In some embodiments, the method reduces foam by 100% or less (e.g., 95% or less, 90% or less, 85% or less, 80% or less, 75% or less, 70% or less, 65% or less, 60% or less, or 55% or less).

The method reduces foam by a percent ranging from any of the minimum values described above to any of the maximum values described above. For example, in some embodiments, the method reduces foam from 50% to 100% (e.g., 50% to 60%, 50% to 70%, 50% to 80%, 50% to 90%, from 60% to 100%, from 60% to 70%, from 60% to 80%, from 60% to 90%, from 70% to 100%, from 70% to 80%, from 70% to 90%, from 80% to 90%, from 80% to 100%, or from 90% to 100%).

For a given foam, foam reduction potential can be determined by generating a foam in a 1000 ml jar by stirring 100 mL of the liquid components of the foam (e.g., surfactant(s) and solvents including water, cosolvents, and hydrocarbons) at 2000 rpm for 30 seconds with an overhead mixer. The mixer was then stopped, and the initial foam height was measured after waiting 3 minutes. A tested volume of the breaking composition was then added, and the sample was mixed at 300 rpm for 1 minute. Ending foam height was then measured after 5 minutes. The foam reduction potential (percent foam reduction, fr) was then calculated based on equation 1 below:

$$fr\ \% = 100(ifh - efh)/ifh \quad (1)$$

where the fr % is the foam reduction potential, ifh is the initial foam height and efh is the ending foam height.

EXAMPLE EMBODIMENTS

Certain example implementations are described in the embodiments below.

Embodiment 1: A method of breaking a foam, emulsion, or any combination thereof, the method comprising:

- contacting the foam, emulsion, or any combination thereof with a breaking composition,
- wherein the breaking composition comprises a sulfosuccinate and a solvent;
- wherein the solvent has an octanol/water partition coefficient ([P]) at 25°, and wherein the log of the partition coefficient at 25° (log[P]) is from 0.1 to 5.

Embodiment 2: The method of embodiment 1, wherein the breaking composition further comprises a surfactant having a kraft point of at least 30° C.

Embodiment 3: The method of embodiment 2, wherein the surfactant comprises an aryl sulfonate surfactant.

Embodiment 4: The method of any one of embodiments 2-3, wherein the breaking composition comprises a sulfosuccinate, an aryl sulfonate surfactant, and a solvent.

Embodiment 5: The method of embodiment 3, wherein the aryl sulfonate surfactant comprises an alkyl aryl sulfonate surfactant, an alkoxy aryl sulfonate surfactant, or any combination thereof.

Embodiment 6: The method of any one of embodiments 3-5, wherein the aryl sulfonate surfactant is a branched alkyl aryl sulfonate surfactant.

Embodiment 7: The method of any one of embodiments 1-6, wherein the sulfosuccinate is present in the breaking composition in a concentration of from 10% v/v to 40% v/v.

Embodiment 8: The method of embodiment 7, wherein the sulfosuccinate is present in the breaking composition in a concentration of from 12% v/v to 35% v/v (e.g., 18% v/v to 23% v/v).

Embodiment 9: The method of any one of embodiments 3-8, wherein the aryl sulfonate surfactant is present in the breaking composition in a concentration of from 0.5% v/v to 5% v/v.

Embodiment 10: The method of embodiment 9, wherein the aryl sulfonate surfactant is present in the breaking composition in a concentration of from 0.8% v/v to 3% v/v.

Embodiment 11: The method of any one of embodiments 1-10, wherein the solvent is present in the breaking composition in a concentration of from 40% v/v to 90% v/v.

Embodiment 12: The method of any one of embodiments 1-11, wherein the solvent and the sulfosuccinate are present in the breaking composition in a ratio of solvent to sulfosuccinate of from 1.2:1 to 10:1, such as 1.5:1, 2:1, 3:1, 4:1, 5:1, 6:1, 7:1, 8:1, or 9:1.

Embodiment 13: The method of any one of embodiments 3-12, wherein the sulfosuccinate, solvent, and aryl sulfonate are present in the breaking composition in a ratio of sulfosuccinate to solvent to aryl sulfonate of from 1:1.2:0.05 to 1:10:0.1, such as 1:1.2:0.1, 1:2:0.1, 1:3:0.1, 1:4:0.1, 1:5:0.1, or 1:6:0.1.

Embodiment 14: The method of any one of embodiments 1-13, wherein the solvent comprises an alcohol.

Embodiment 15: The method of embodiment 14, wherein the alcohol is selected from hexanol (e.g., n-hexanol), isopropanol, 2-ethylhexanol (e.g., 2-ethyl-1-hexanol), 4-methyl-2-pentanol (also known as methylisobutyl carbinol), 2-butoxyethanol, benzyl alcohol, isobutanol, sec-butanol, tert-butanol, pentaerythritol, trimethylolpropane, glycerol, ethylene glycol, propylene glycol, or any combination thereof.

Embodiment 16: The method of embodiment 15, wherein the alcohol comprises a polyol.

Embodiment 17: The method of any one of embodiments 15-16, wherein the alcohol comprises glycerol.

Embodiment 18: The method of any one of embodiments 15-17, wherein the alcohol comprises glycerol, ethylene glycol, or any combination thereof.

Embodiment 19: The method of any one of embodiments 15-18, wherein the alcohol comprises 4-methyl-2-pentanol.

Embodiment 20: The method of any one of embodiments 15-19, wherein the alcohol comprises glycerol, ethylene glycol, 4-methyl-2-pentanol, or any combination thereof.

Embodiment 21: The method of any one of embodiments 1-20, wherein the solvent comprises an ether.

Embodiment 22: The method of embodiment 21, wherein the solvent is selected from ethylene glycol butyl ether (EGBE), diethylene glycol monobutyl ether (DGBE), triethylene glycol monobutyl ether (TEGBE), ethylene glycol dibutyl ether (EGDE), or any combination thereof.

Embodiment 23: The method of any one of embodiments 1-22, wherein the solvent comprises an aromatic organic solvent.

Embodiment 24: The method of embodiment 23, wherein the aromatic organic solvent is selected from toluene, xylene, or any combination thereof.

Embodiment 25: The method of any one of embodiments 1-24, wherein the breaking composition comprises the sulfosuccinate, glycerol, ethylene glycol, and 4-methyl-2-pentanol.

Embodiment 26: The method of any one of embodiments 1-25, wherein the breaking composition comprises the sulfosuccinate, glycerol, and 4-methyl-2-pentanol.

Embodiment 27: The method of any one of embodiment 1-26, wherein the breaking composition comprises from 15% v/v to 25% v/v sulfosuccinate, from 70% v/v to 80% v/v 4-methyl-2-pentanol, and from 1% v/v to 5% v/v glycerol.

Embodiment 28: The method of any one of embodiments 1-27, wherein the method reduces foam by (exhibits a foam reduction potential of) at least 50%, such as from 50% to 100%, 50% to 60%, 50% to 70%, 50% to 80%, 50% to 90%, from 60% to 100%, from 60% to 70%, from 60% to 80%, from 60% to 90%, from 70% to 100%, from 70% to 80%, from 70% to 90%, from 80% to 90%, from 80% to 100%, or from 90% to 100%.

Embodiment 29: The method of any one of embodiments 1-28, wherein the breaking composition further comprises one or more defoamers, demulsifiers, or any combination thereof.

Embodiment 30: The method of embodiment 29, wherein the one or more defoamers, demulsifiers, or any combination thereof comprise an oil-based defoamer, a water-based defoamer, a silicone-based defoamer, an alkyleneoxy-based defoamer, a polyacrylate defoamer, a ketone-based defoamer, a phenol-formaldehyde resins such as an acid-catalyzed phenol-formaldehyde resin or a base-catalyzed phenol-formaldehyde resin, an epoxy resin, a polyamines such as a polyamine polymers, a polyol, a di-epoxide, a dendrimer, a star polymer, a zwitterionic surfactant, a cationic surfactant, or any combination thereof.

Embodiment 31: The method of any one of embodiments 29-30, wherein the one or more defoamers, demulsifiers, or any combination thereof comprise an oligo- and/or polysiloxane (silicone), such as a polydimethylsiloxane (e.g., $(CH_3)_3SiO[SiO(CH_3)_2]_nSi(CH_3)_3$), decamethylpentasiloxane, an organo-modified silicone, octamethylcyclotetrasiloxane, a silicone polyalkyleneoxide, a silicone glycol, a silicone co-polymer, a fluorosiloxane (e.g., trifluoropropylmethylsiloxane), a trimethylsiloxy-terminated polydimethylsiloxane, a trimethylsiloxy-terminated trifluoropropylmethylsiloxane, a alkylaryl siloxane, a polyether-modified polysiloxane, or any combination thereof.

Embodiment 32: The method of any one of embodiments 1-31, wherein the foam, the emulsion, or any combination thereof is present on or within equipment associated with an oil and gas operation.

Embodiment 33: The method of any one of embodiments 1-32, wherein the foam, the emulsion, or any combination thereof is present in a separator, and wherein the method comprises injecting the breaking composition into the separator, injecting the breaking composition upstream of the separator, injecting the breaking composition downstream of the separator, or any combination thereof.

Embodiment 34: The method of any one of embodiments 1-33, wherein the foam, the emulsion, or any combination thereof is present in a pipe, in a pipeline, in a wellhead, or any combination thereof, and wherein the method comprises injecting the breaking composition into the pipe, into the pipeline, into the wellhead, or any combination thereof.

Embodiment 35: The method of embodiment 34, wherein the method comprises continuously injecting the breaking composition.

Embodiment 36: The method of any one of embodiments 1-35, wherein the foam, the emulsion, or any combination thereof comprises a produced fluid.

Embodiment 37: The method of embodiment 36, wherein the produced fluid comprises an aqueous component, a hydrocarbon component, and one or more surfactants.

Embodiment 38: The method of any one of embodiments 1-37, wherein the breaking composition further comprises one or more additional surfactants, and wherein the one or more additional surfactants comprise one or more non-ionic surfactants, one or more anionic surfactants, one or more cationic surfactants, one or more zwitterionic surfactants, or any combination thereof.

Embodiment 39: The method of embodiment 38, wherein the one or more additional surfactants comprise one or more non-ionic surfactants, and wherein the one or more non-ionic surfactants comprises a branched or unbranched C6-C32:PO(0-65):EO(0-100), such as a branched or unbranched C6-C30:PO(30-40):EO(25-35), a branched or unbranched C6-C12:PO(30-40):EO(25-35), or a branched or unbranched C6-C30:EO(8-30).

Embodiment 40: The method of any of embodiments 38-39, wherein the one or more additional surfactants comprise one or more anionic surfactants, and wherein the one or more anionic surfactant comprise one or more of the following:

a branched or unbranched C6-C32:PO(0-65):EO(0-110)-carboxylate, such as a branched or unbranched C6-C30:PO(30-40): E0 (25-35)-carboxylate, a branched or unbranched C6-C12:PO(30-40):EO(25-35)-carboxylate, or a branched or unbranched C6-C30:EO(8-30)-carboxylate;

a C8-C30 alkyl benzene sulfonate (ABS);

an internal olefin sulfonate (IOS);

an isomerized olefin sulfonate;

an alfa olefin sulfonate (AOS), a sulfosuccinate surfactant;

an alcohol sulfate surfactant;

an alkoxy sulfate surfactant;

a surfactant defined by the formula below

wherein $R^1$ comprises a branched or unbranched, saturated or unsaturated, cyclic or non-cyclic, hydrophobic carbon chain having 6-32 carbon atoms and an oxygen atom linking $R^1$ and $R^2$;

$R^2$ comprises an alkoxylated chain comprising at least one oxide group selected from the group consisting of ethylene oxide, propylene oxide, butylene oxide, and any combination thereof; and $R^3$ comprises a branched or unbranched hydrocarbon chain comprising 2-12 carbon atoms and from 2 to 5 carboxylate groups;

a surfactant defined by the formula below

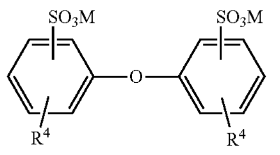

wherein $R^4$ is, individually for each occurrence, a branched or unbranched, saturated or unsaturated, cyclic or non-cyclic, hydrophobic carbon chain having 6-32 carbon atoms; and M represents a counterion;

or any combination thereof.

Embodiment 41: A breaking composition comprising a sulfosuccinate and a solvent, wherein the solvent has an octanol/water partition coefficient ([P]) at 25°, and wherein the log of the partition coefficient at 25° (log[P]) is from 0.1 to 5.

Embodiment 42: The composition of embodiment 41, further comprising a surfactant having a kraft point of at least 30° C.

Embodiment 43: The composition of embodiment 42, wherein the surfactant comprises an aryl sulfonate surfactant.

Embodiment 44: The composition of any one of embodiments 42-43, wherein the breaking composition comprises a sulfosuccinate, an aryl sulfonate surfactant, and a solvent.

Embodiment 45: The composition of embodiment 43, wherein the aryl sulfonate surfactant comprises an alkyl aryl sulfonate surfactant, an alkoxy aryl sulfonate surfactant, or any combination thereof.

Embodiment 46: The composition of any one of embodiments 43-45, wherein the aryl sulfonate surfactant is a branched alkyl aryl sulfonate.

Embodiment 47: The composition of any one of embodiments 41-46, wherein the sulfosuccinate is present in the breaking composition in a concentration of from 10% v/v to 40% v/v.

Embodiment 48: The composition of embodiment 47, wherein the sulfosuccinate is present in the breaking composition in a concentration of from 12% v/v to 35% v/v.

Embodiment 49: The composition of any one of embodiments 42-48, wherein the aryl sulfonate surfactant is present in the breaking composition in a concentration of from 0.5% v/v to 5% v/v.

Embodiment 50: The composition of embodiment 49, wherein the aryl sulfonate surfactant is present in the breaking composition in a concentration of from 0.8% v/v to 3% v/v.

Embodiment 51: The composition of any one of embodiments 41-50, wherein the solvent is present in the breaking composition in a concentration of from 40% v/v to 80% v/v.

Embodiment 52: The composition of any one of embodiments 41-51, wherein the solvent and the sulfosuccinate are present in the breaking composition in a ratio of solvent to sulfosuccinate of from 1.2:1 to 10:1, such as 1.5:1, 2:1 3:1, 4:1, 5:1, 6:1, 7:1, 8:1, or 9:1.

Embodiment 53: The composition of any one of embodiments 43-52, wherein the sulfosuccinate, solvent, and aryl sulfonate are present in the breaking composition in a ratio of sulfosuccinate to solvent to aryl sulfonate of from 1:1.2:0.05 to 1:10:0.05, such as 1:1.2:0.1, 1:2:0.1, 1:3:0.1, 1:4:0.1, 1:5:0.1, or 1:6:0.1.

Embodiment 54: The composition of any one of embodiments 41-53, wherein the solvent comprises an alcohol.

Embodiment 55: The composition of embodiment 54, wherein the alcohol is selected from hexanol (e.g., n-hexanol), isopropanol, 2-ethylhexanol (e.g., 2-ethyl-1-hexanol), 4-methyl-2-pentanol (also known as methylisobutyl carbinol), 2-butoxyethanol, benzyl alcohol, isobutanol, sec-butanol, tert-butanol, pentaerythritol, trimethylolpropane, glycerol, ethylene glycol, propylene glycol, or any combination thereof.

Embodiment 56: The composition of embodiment 55, wherein the alcohol comprises a polyol.

Embodiment 57: The composition of any one of embodiments 55-56, wherein the alcohol comprises glycerol.

Embodiment 58: The composition of any one of embodiments 55-57, wherein the alcohol comprises glycerol, ethylene glycol, or any combination thereof.

Embodiment 59: The composition of any one of embodiments 55-58, wherein the alcohol comprises 4-methyl-2-pentanol.

Embodiment 60: The composition of any one of embodiments 55-59, wherein the alcohol comprises glycerol, ethylene glycol, 4-methyl-2-pentanol, or any combination thereof.

Embodiment 61: The composition of any one of embodiments 41-60, wherein the solvent comprises an ether.

Embodiment 62: The composition of embodiment 61, wherein the solvent is selected from ethylene glycol butyl ether (EGBE), diethylene glycol monobutyl ether (DGBE), triethylene glycol monobutyl ether (TEGBE), ethylene glycol dibutyl ether (EGDE), or any combination thereof.

Embodiment 63: The composition of any one of embodiments 41-62, wherein the solvent comprises an aromatic organic solvent.

Embodiment 64: The composition of embodiment 63, wherein the aromatic organic solvent is selected from toluene, xylene, or any combination thereof.

Embodiment 65: The composition of any one of embodiments 41-64, wherein the breaking composition comprises the sulfosuccinate, glycerol, ethylene glycol, and 4-methyl-2-pentanol.

Embodiment 66: The composition of any one of embodiments 41-65, wherein the breaking composition comprises the sulfosuccinate, glycerol, and 4-methyl-2-pentanol.

Embodiment 67: The composition of any one of embodiment 41-66, wherein the breaking composition comprises from 15% v/v to 25% v/v sulfosuccinate, from 70% v/v to 80% v/v 4-methyl-2-pentanol, and from 1% v/v to 5% v/v glycerol.

EXAMPLES

The examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art. Efforts have been made to ensure accuracy with respect to numbers (e.g., amounts, temperature, etc.) but some errors and deviations should be accounted for. Unless indicated otherwise, parts are parts by weight, percents associated with components of compositions are percent by weight, based on the total weight of the composition including the components, temperature is in ° C. or is at ambient temperature, and pressure is at or near atmospheric.

Example 1: Development of Sulfosuccinate Based Emulsion and Foam Breakers (Dual Action Breakers)

Demulsifiers and defoamers can play a role in demulsification and defoaming during field chemical treatments. In many cases, emulsion breakers and foam breakers are independently used for emulsion and foam issues, respectively. The current set of commercially available oil field emulsion breakers and foam breakers are not tailored to handle the complex chemistry of enhanced recovery chemicals. The function of emulsion breakers is opposite of emulsifiers. Many surfactants that are used as demulsifiers can disturb the organized surfactant structure present in the oil-water interface in the emulsion droplets and destabilize the emulsion. Eventually, the emulsion can then separate into hydrophilic and hydrophobic phases due to the flocculation and coalescence of disturbed fluid. Defoamers can also include surfactants capable of displacing foam-stabilizing surfactant components and penetrating the lamellae of a foam to allow the entrapped gas to get free and the foam to collapse.

Experimental

Sulfosuccinates and alkyl aryl sulfonates were used as the demulsifying agent and 2-butoxyethanol, xylenes, 4-methyl-2-pentanol and various alcohols (Table 1) were used as the carrier solvents. 28% ammonium hydroxide was used as the neutralizing agent as needed. Synthetic brine with various TDSs were used as the aqueous media in laboratory experiments.

An overhead mixer with the water bath were used to generate emulsion and foam, as shown in FIG. 1A. A rotating mixer was used to ensure uniform mixing of the emulsion and emulsion breakers, as shown in FIG. 1B. A water bath was used to maintain the produce temperature, as shown in FIG. 1C.

Selected chemicals were combined in various ratios to prepare emulsion/foam, dual breakers. Selected formulations were neutralized with ammonium hydroxide. These breaker formulations were tested in lab conditions with various oil and brines at different temperatures. Finally, selected formulations based on lab experiments were tested in the field to assess efficiency.

Results

General Procedure for Demulsifier Evaluation 10-30% crude oil and surfactant solution were mixed using an overhead mixer (50 rpm) at 40° C. for around 5 minutes. After setting up the safety shield, the solution was mixed at 3000 rpm for 3 minutes using overhead mixer to generate emulsion. The emulsion solution was transferred to 10 ml centrifuge tubes with different amounts of demulsifiers and tubes were properly mixed using rotating mixer. Then the observations were recorded.

Selection of Potential Sulfosuccinate for Demulsifiers

As the starting point, various types of sulfosuccinates were blended with carrier solvents (Table 1) in various ratio to make demulsifier formulations and those blends were tested with crude oil and surfactant (0.3% formulation 1 (0.18% C16-18-25EO and 0.12% disulfonate)) in 30K hard brine at 40° C. Table 2 shows some examples of sulfosuccinate and carrier solvent ratios that were tested.

TABLE 1

Evaluated sulfosuccinates and carrier solvents.

| Sulfosuccinate | Carrier solvent |
|---|---|
| Sulfosuccinate 1 | Xylene |
| Sulfosuccinate 2 | 2-butoxyethanol |
| Sulfosuccinate 3 | 4-methyl-2-pentanol |
| Sulfosuccinate 4 | Triethylene glycol mono butyl ether |
| Sulfosuccinate 5 | Diethylene glycol monobutyl ether |
| Sulfosuccinate 6 | hexanol |
| | Pentanol |
| | 1-butanol |

TABLE 1-continued

| Evaluated sulfosuccinates and carrier solvents. | |
|---|---|
| Sulfosuccinate | Carrier solvent |
| | Tert butanol<br>Iso propyl alcohol<br>Glycerol<br>Ethylene glycol |

TABLE 2

Examples of emulsion breaker formulations.

| Sulfosuccinate | Carrier solvent | Ratio (Sulfosuccinate:Carrier Solvent) |
|---|---|---|
| Sulfosuccinate 4 | EGBE | 1:3 |
| Sulfosuccinate 4 | EGBE | 2:3 |
| Sulfosuccinate 4 | EGBE | 2:5 |
| Sulfosuccinate 4 | EGBE | 1:1 |
| Sulfosuccinate 4 | (TEGBE, EGBE, DEGBE mix) | 1:1 |
| Sulfosuccinate 4 | (TEGBE, EGBE, DEGBE mix) | 2:3 |
| Sulfosuccinate 1 | EGBE | 1:3 |
| Sulfosuccinate 1 | EGBE | 3:1 |
| Sulfosuccinate 1 | EGBE | 1:3 |
| Sulfosuccinate 3 | EGBE | 3:2 |
| Sulfosuccinate 3 | EGBE | 1:1 |
| Sulfosuccinate 3 | EGBE | 1:1 |
| Sulfosuccinate 4 | 4-methyl-2-pentanol | 1:3 |
| Sulfosuccinate 4 | 4-methyl-2-pentanol | 2:3 |
| Sulfosuccinate 4 | 4-methyl-2-pentanol | 2:5 |
| Sulfosuccinate 4 | 4-methyl-2-pentanol | 1:1 |

Emulsions were prepared using 0.3% formulation 1 and 10% oil in 30K brine at 40 C. Sulfosuccinates 1, 2,3,4, 5 and 6 were individually blended in various ratios with the carrier solvents in Table 1 and then used as emulsion breakers. A 4000 ppm dosage was used to observe clear separation. Sulfosuccinate 1 blended with 4-methyl-2-pentanol and 2-butoxyethanol showed clear oil water separation within the expected time frame but the blend with 2-butoxyethanol showed faster separation. See FIG. 2.

Figure 3:
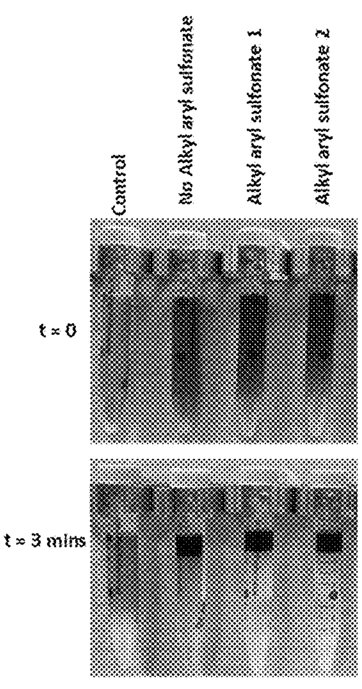
FIG. 3 shows an image of the evaluation of types of alkyl aryl sulfonates.

Sulfosuccinate 1 and 2-butoxyethanol were selected for further evaluation due to their good performance. Two types of alkyl aryl sulfonic acids (1-branched and 2-linear with similar number of carbon) were incorporated into the sulfosuccinate 1 and 2-butoxyethanol blend to further improvement of the quality of the aqueous phase. Final solution was basified with ammonium hydroxide (~pH 9). Emulsion was prepared as the previous with 20% oil and the emulsion breaking combinations were tested as shown in FIG. 3.

This observation indicates that the addition of branched alkyl aryl sulfonates helps to clear the aqueous phase. Breaker formulation with alkyl aryl sulfonate 1 was evaluated in the field as the next step.

Figure 4:
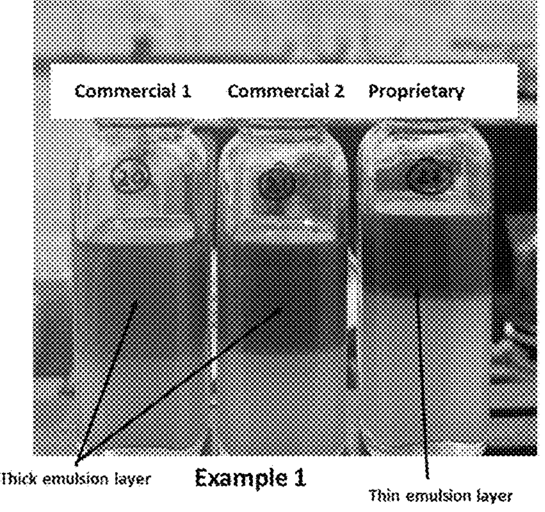
FIG. 4 shows images comparing emulsion breaking potential in the field samples.
Figure 4:
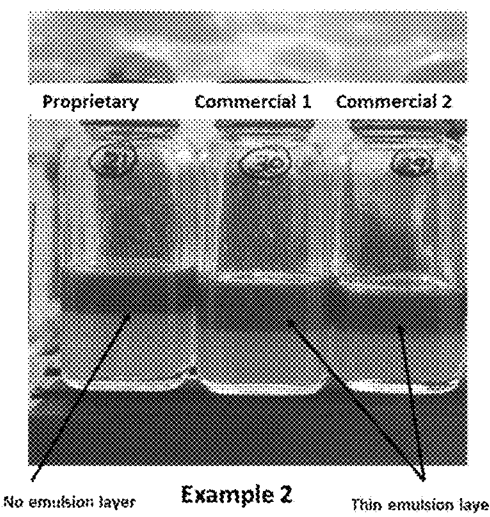
Figure 5:
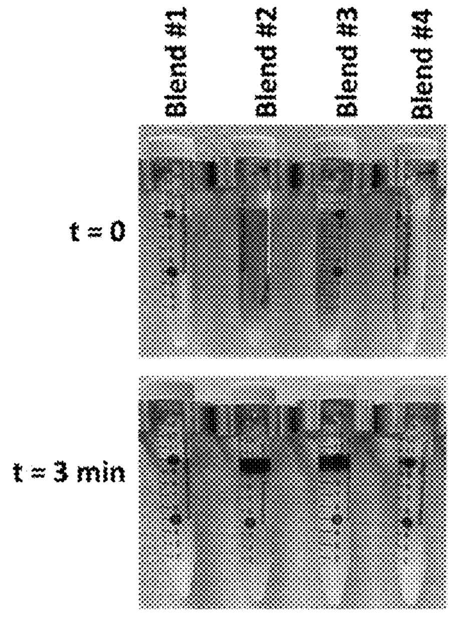
FIG. 5 shows images of demulsification using the blends in Table 3.
Figure 6:
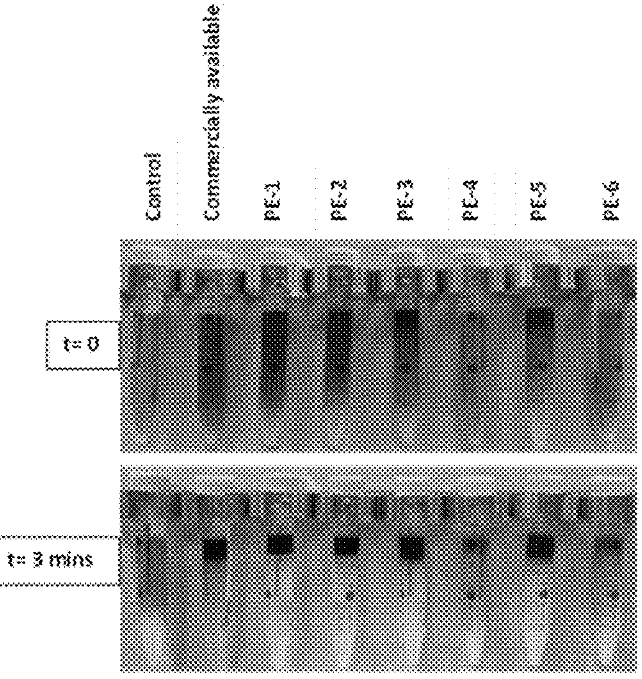
FIG. 6 shows images of emulsion breakers (PE) in the lab conditions.
Figure 7:
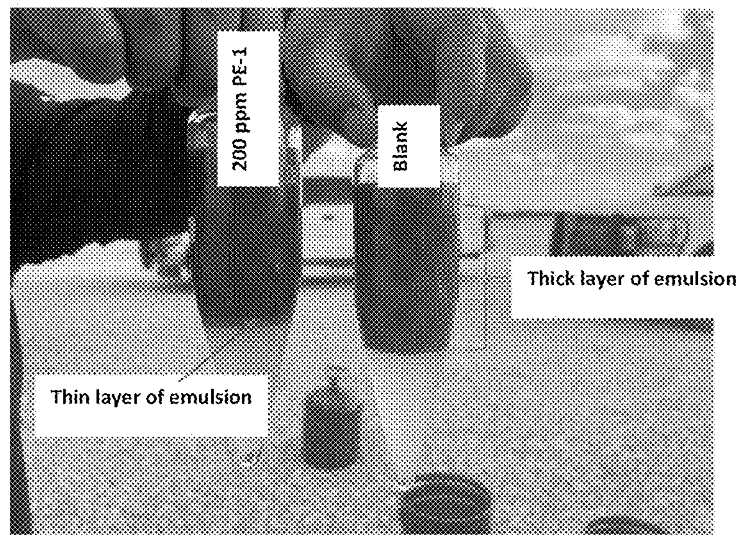
FIG. 7 shows an image comparing PE-1 with the blank.
Figure 8:
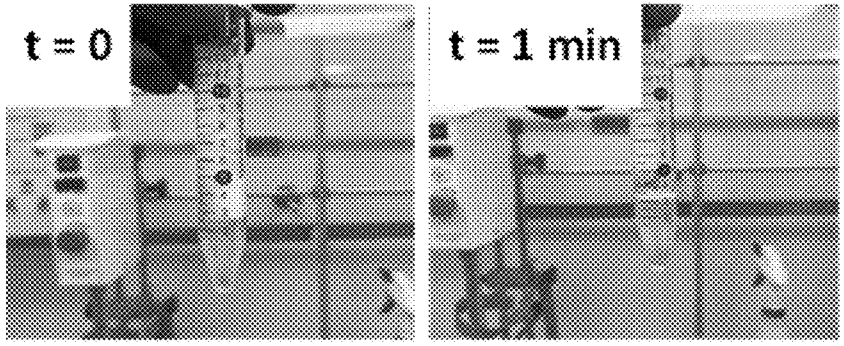
FIG. 8 shows images of defoaming potential of emulsion breakers modified with silicone fluids to add defoaming properties.
Figure 9:
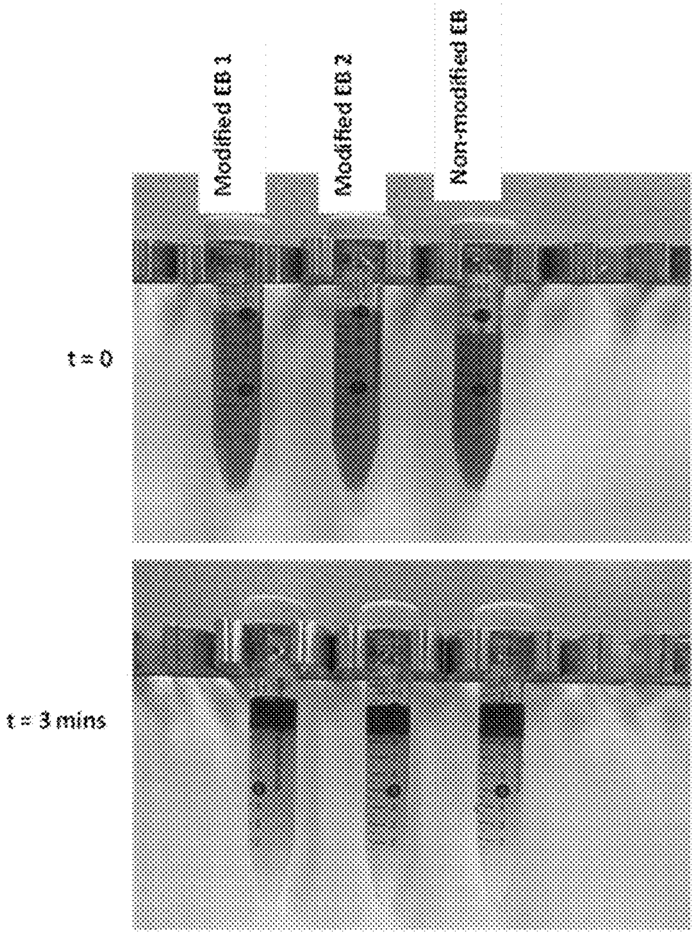
FIG. 9 shows images at t=0, the tube with non-modified emulsion breaker (EB) shows a layer of foam due to lack of defoaming potential. All three formulations show similar demulsification potential.
Figure 10:
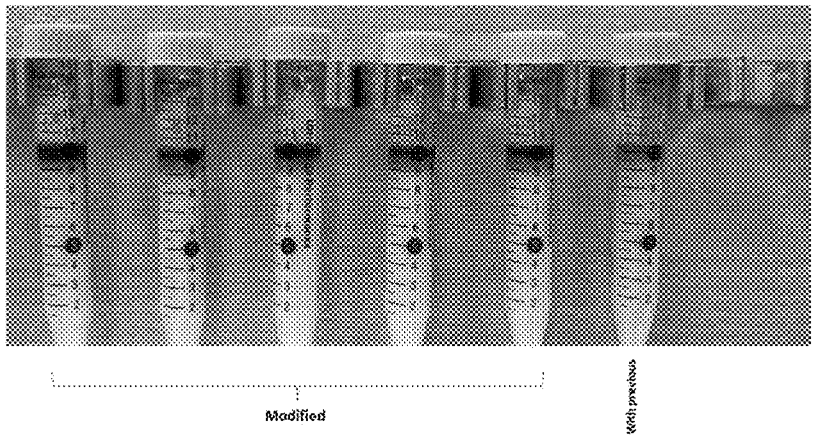
FIG. 10 shows images of demulsification using breaking compositions including a sulfosuccinate, 4-methyl-2-pentanol, and varying amounts of glycerol ("modified" samples). Demulsification achieved using a breaking composition including a sulfosuccinate, 4-methyl-2-pentanol, and an alkyl aryl sulfonate is shown for comparison ("previous" sample).
Figure 11A:
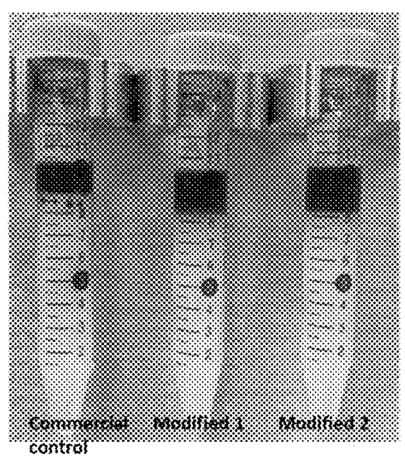
FIG. 11A shows images of demulsification achieved using a breaking composition including a sulfosuccinate, 4-methyl-2-pentanol, and glycerol. An emulsion was prepared using surfactant formulation 1 (C16-18 25EO and disulfonate), oilfield chemicals (a friction reducer, scale inhibitor, and biocide), black crude oil, and brine. The breaking composition was then added, and the resulting demulsification was photographed after 3 minutes at 40° C. The experiment was performed in duplicate (samples labeled "modified 1" and "modified 2"). For comparison, a control experiment was performed using a commercially available demulsifier (blend of sulfonates and oxyalkylated phenolic resins in an aromatic/alcohol solvent).
Figure 11B:
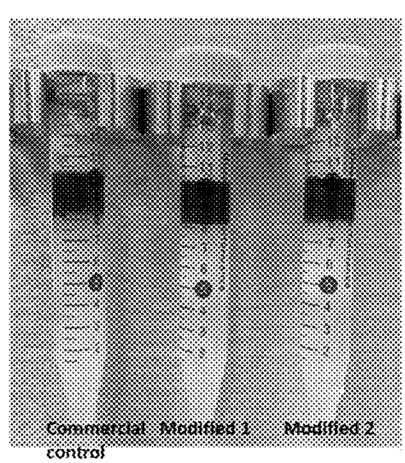
FIG. 11B shows images of demulsification achieved using a breaking composition including a sulfosuccinate, 4-methyl-2-pentanol, and glycerol. An emulsion was prepared using surfactant formulation 2 (C12-14 40EO and disulfonate), oilfield chemicals (a friction reducer, scale inhibitor, and biocide), black crude oil, and brine. The breaking composition was then added, and the resulting demulsification was photographed after 3 minutes at 40° C. The experiment was performed in duplicate (samples labeled "modified 1" and "modified 2"). For comparison, a control experiment was performed using a commercially available demulsifier (blend of sulfonates and oxyalkylated phenolic resins in an aromatic/alcohol solvent).
Figure 12:
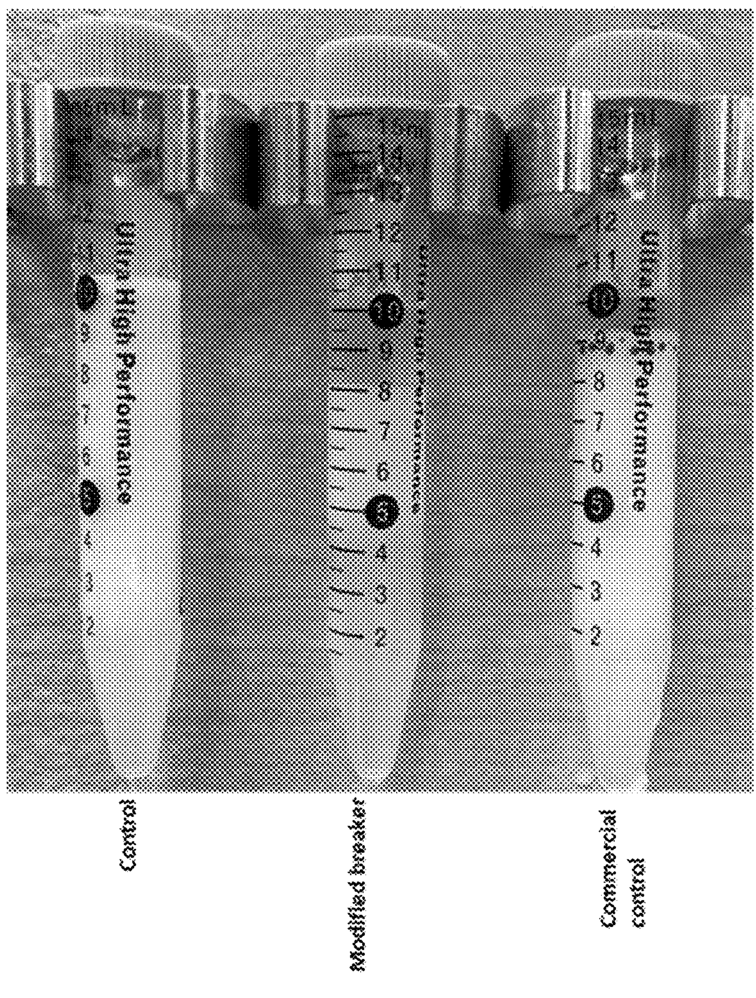
FIG. 12. shows the demulsification achieved using a breaking composition including a sulfosuccinate, 4-methyl-2-pentanol, and glycerol. An emulsion was prepared using surfactant formulation 1 (C16-18 25EO and disulfonate), oilfield chemicals (a friction reducer, scale inhibitor, and biocide), volatile crude oil, and brine. The breaking composition was then added, and the resulting demulsification was photographed after 3 minutes at 40° C. The results achieved using the breaking composition are shown in the sample labeled "modified breaker." For comparison, a control containing no breaking composition (sample labeled "control") and a control experiment was performed using a commercially available demulsifier (blend of sulfonates and oxyalkylated phenolic resins in an aromatic/alcohol solvent; sample labeled "commercial control") are included.

In a field experiment, this breaker formulation was evaluated with the most common commercially available emulsion breakers to compare performance. The emulsion breaker (proprietary breaker) showed better performance compared to the most common breakers in the field, as shown in FIG. 4. The dosage was 2000 ppm based on the total volume.

Due to the higher demand of dual action breakers (compositions that can act as both emulsion and foam breakers), the above formulation was modified. Since the formulation with 2-butoxyethanol does not show good defoaming potential, 4-methyl-2-pentanol was incorporated because 4-methyl-2-pentanol shows good defoaming potential (see, for example, U.S. Patent Application Publication No. 2021/0179930, which is hereby incorporated by reference in its entirety). At the same time a sulfosuccinate (sulfosuccinate 4) with similar demulsification potential was introduced instead of sulfosuccinate 1. A series of blends were tested for the foam breaking potential and one set is shown as an example. See Table 3 and FIG. 3.

General Procedure for Defoamer Evaluation 90 mL of surfactant solution and 10 ml of oil were added in to a 1000 ml glass jar and the mixture was kept at 40° C. water bath around 30 minutes. Then, an overhead mixer was placed into the surfactant and oil mixture. After setting up the safety shield, the surfactant solution was mixed at 2000 rpm for 30 seconds to generate a foam. The overhead mixer was then stopped. Initial foam height was recorded after 3 minutes. After adding a target amount of defoaming agent, the solution was mixed at 300 rpm for 1 minute. Foam height was then recorded with after five minutes. Then foam reduction potential (fr) was calculated based on the below equation 1.

$$fr\ \% = 100(ifh - efh)/ifh \quad (1)$$

Where the fr % is the foam reduction potential, ifh is the initial foam height and efh is the ending foam height.

TABLE 3

Combination of chemicals for foam breaking blends for lab testing and foam reduction potential. (Defoamer dosage was 500 ppm).

| Blend # | Sulfo-succinate 4 Active wt % | Alkyl aryl sulfonate 1/Active wt % | 4-methyl-2-pentanol/ Active wt % | Water or other solvents/ Active wt % | fr poten-tial/% |
|---|---|---|---|---|---|
| 1 | 33.33 | 2.38 | 47.62 | 16.67 | 65 |
| 2 | 22.58 | 1.61 | 64.52 | 11.29 | 80 |
| 3 | 17.07 | 1.22 | 73.17 | 8.54 | 100 |
| 4 | 13.73 | 0.98 | 18.43 | 6.86 | 100 |

The above observations indicate that a higher concentration of 4-methyl-2-pentanol improves the defoaming potential. Next challenge was to identify the proper 4-methyl-2-pentanol concentration to optimize the demulsifier potential. So, demulsification testing was performed with the above blends to identify the correct formula. Based on the demulsification testing, 73.17% of 4-methyl-2-pentanol (Blend #3) showed the optimum performance (FIG. 4) because it showed the clear aqueous phase and sharp oil-water interface.

Subsequently, multiple emulsion and foam breaking experiments were conducted using blend #3 in Table 3. These trials validated that blend #3 should be used in field testing. To avoid corrosion associated with the higher pH of breakers, the pH was adjusted to neutral, and field testing was performed. Table 4 indicates the 100% foam reduction potential of various field samples with blend #3. Field testing was conducted as below. Samples were collected to the 500 ml measuring cylinder and various dosages of PH neutral breaker were added and time for the 100% foam reduction was recorded.

TABLE 4

| Examples of foam reduction potential of various field samples with blend #3. | | |
|---|---|---|
| Sample # | Dosage/ppm | Time for 100% fr/s |
| 1 | 250 | 10 |
| 2 | 342 | 29 |
| 3 | 171 | 48 |
| 4 | 169 | 100 |

The combination of a sulfosuccinate, 4-methyl-2-pentanol, and a branched alkyl aryl sulfonate can be used as a dual action breaker to treat oil field foams and emulsions. Its pH neutral nature does not impede the breaker's potential. An example formulation includes 1:3:0.1 sulfosuccinate, 4-methyl-2-pentanol, and branched alkyl aryl sulfonate respectively.

REFERENCES

Lakr L. W., Petroleum Engineering Handbook, Society of Petroleum Engineers, p. 61-122, 2006.

Example 2: Development of Sulfosuccinate Based Emulsion and Foam Breakers (Dual Action Breakers) Including Polyol Carrier Solvents Example breaking compositions including both a sulfosuccinate and a polyol carrier solvent are shown in Table 5.

TABLE 5

| Examples of breaking compositions evaluated (concentrations in volume percent). | | | | |
|---|---|---|---|---|
| EX # | sulfosuccinate | 4-methyl-2-pentanol | Glycerol | Ethylene Glycol |
| EX-1 | 14% | 85% | 0.28% | 0.0% |
| EX-2 | 25% | 74% | 1.23% | 0.0% |
| EX-3 | 24% | 73% | 2.44% | 0.0% |
| EX-4 | 39% | 59% | 1.96% | 0.0% |
| EX-5 | 24% | 71% | 4.76% | 0.0% |
| EX-6 | 23% | 70% | 6.98% | 0.0% |
| EX-7 | 23% | 68% | 9.09% | 0.0% |
| EX-8 | 22% | 67% | 11.11% | 0.0% |

TABLE 5-continued

| Examples of breaking compositions evaluated (concentrations in volume percent). | | | | |
|---|---|---|---|---|
| EX # | sulfosuccinate | 4-methyl-2-pentanol | Glycerol | Ethylene Glycol |
| EX-9 | 39% | 59% | 1.96% | 0.0% |
| EX-10 | 24% | 73% | 0.00% | 2.4% |
| EX-11 | 24% | 71% | 0.00% | 4.8% |
| EX-12 | 24% | 73% | 1.22% | 1.2% |
| EX-13 | 49% | 49% | 1.64% | 0.0% |
| EX-14 | 20% | 78% | 1.96% | 0.0% |
| EX-15 | 16% | 82% | 1.64% | 0.0% |
| EX-16 | 32% | 65% | 3.23% | 0.0% |

TABLE 6

| Examples of breaking compositions evaluated (concentrations in weight percent). | | | | | |
|---|---|---|---|---|---|
| EX # | sulfosuccinate | 4-methyl-2-pentanol | Glycerol | Ethylene Glycol | Other |
| EX-1 | 11.4%-12.82% | 85.47% | 0.28% | 0.00% | 1.43%-2.85% |
| EX-2 | 19.75%-22.22% | 74.07% | 1.23% | 0.00% | 2.47%-4.94% |
| EX-3 | 19.51%-21.95% | 73.17% | 2.44% | 0.00% | 2.44%-4.88% |
| EX-4 | 31.37%-35.29% | 58.82% | 1.96% | 0.00% | 3.93%-7.85% |
| EX-5 | 19.05%-21.43% | 71.43% | 4.76% | 0.00% | 2.38%-4.76% |
| EX-6 | 18.60%-20.94% | 69.77% | 6.98% | 0.00% | 2.32%-4.66% |
| EX-7 | 18.18%-20.45% | 68.18% | 9.09% | 0.00% | 2.28%-4.55% |
| EX-8 | 17.7%-20% | 66.67% | 11.11% | 0.00% | 2.22%-4.52% |
| EX-9 | 31.37%-35.30% | 58.82% | 1.96% | 0.00% | 3.92%7.85% |
| EX-10 | 19.51%-21.95% | 73.17% | 0.00% | 2.44% | 2.44%-4.88% |
| EX-11 | 19.04%-21.44% | 71.43% | 0.00% | 4.76% | 2.37%-4.77% |
| EX-12 | 19.51%-21.96% | 73.17% | 1.22% | 1.22% | 2.73%-4.88% |
| EX-13 | 39.34%-44.27% | 49.18% | 1.64% | 0.00% | 4.91%-9.84% |
| EX-14 | 15.68%-17.66% | 78.43% | 1.96% | 0.00% | 1.95%-3.93% |
| EX-15 | 13.11%-14.76% | 81.97% | 1.64% | 0.00% | 1.63%-3.28% |
| EX-16 | 25.80%-29.04% | 64.52% | 3.23% | 0.00% | 3.22%-6.46% |

Procedure for Demulsifier Evaluation of Breaking Composition Described in Tables 5 and 6

10-30% crude oil and aqueous solution were added to a plastic jar. Three different types of aqueous solutions (1, 2, and 3) were prepared: (1) surfactants in a target brine solution; (2) surfactants, friction reducer, and other oil field chemicals at target concentrations in a target brine solution; and (3) friction reducer and other oil field chemicals at target concentrations in a target brine solution.

Solutions were mixed using an overhead mixer (50 rpm) at 40° C. for around 5 minutes. After setting up the safety shield, the solution was mixed at 3,000 rpm for 3 minutes using overhead mixer to generate emulsion. The emulsion solution was transferred to 10 ml centrifuge tubes with different amounts of demulsifiers and tubes were properly mixed using rotating mixer. Then, the observations were recorded.

Procedure for Defoamer Evaluation of Breaking Composition Described in Tables 5 and 6

90 mL of different aqueous solutions and 10 ml of oil were added to a 1,000 ml glass jar. Three different types of aqueous solutions (1, 2, and 3) were prepared: (1) surfactants in a target brine solution; (2) surfactants, friction reducer, and other oil field chemicals at target concentrations in a target brine solution; and (3) friction reducer and other oil field chemicals at target concentrations in a target brine solution.

The mixture was kept at 40° C. water bath for around 30 minutes. Then, overhead mixture was placed into the surfactant and oil mixture. After setting up the safety shield, surfactant solution was mixed at 2,000 rpm for 30 seconds to generate foam and overhead mixture was stopped. Initial foam height was recorded after 3 minutes. After adding target amount of defoaming agent, the solution was mixed at 300 rpm for 1 minute. Foam height was recorded with time up to 5 minutes.

$$fr\ \% = 100(ifh - efh)/ifh$$

where, fr % is foam reduction potential; ifh is initial foam height; efh is ending foam height.

TABLE 7

Combination of chemicals including glycerol for foam breaking blends for lab testing and foam reduction potential. (Defoamer dosage was 500 ppm).

| Blend # | Sulfosuccinate 4 Active wt % | 4-methyl-2-pentanol wt % | Glycerol wt % | Other | fr potential/% |
|---|---|---|---|---|---|
| EX-1 | 11.4%-12.82% | 85.47% | 0.28% | 1.43%-2.85% | 95.00% |
| EX-2 | 19.75%-22.22% | 74.07% | 1.23% | 2.47%-4.94% | 100.00% |
| EX-3 | 19.51%-21.95% | 73.17% | 2.44% | 2.44%-4.88% | 100.00% |
| EX-4 | 31.37%-35.29% | 58.82% | 1.96% | 3.93%-7.85% | 70.00% |
| EX-9 | 31.37%-35.30% | 58.82% | 1.96% | 3.92%7.85% | 90.00% |
| EX-14 | 15.68%-17.66% | 78.43% | 1.96% | 1.95%-3.93% | 100.00% |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

By way of non-limiting illustration, examples of certain embodiments of the present disclosure are given below.

What we claim is:

1. A method of breaking a foam, emulsion, or any combination thereof, the method comprising:

contacting the foam, emulsion, or any combination thereof with a breaking composition, wherein the breaking composition comprises a sulfosuccinate and a solvent;

wherein the solvent has an octanol/water partition coefficient ([P]) at 25°, and wherein the log of the partition coefficient at 25° (log [P]) is from 0.1 to 5;

wherein the sulfosuccinate is present in an amount sufficient to reduce foam by at least 50%.

2. The method of claim 1, wherein the breaking composition further comprises a surfactant having a kraft point of at least 30° C.

3. The method of claim 2, wherein the surfactant comprises an aryl sulfonate surfactant.

4. The method of claim 3, wherein the aryl sulfonate surfactant is present in the breaking composition in a concentration of from 0.5% v/v to 5% v/v.

5. The method of claim 3, wherein the sulfosuccinate, solvent, and aryl sulfonate are present in the breaking composition in a ratio of sulfosuccinate to solvent to aryl sulfonate of from 1:1.2:0.05 to 1:10:0.1.

6. The method of claim 1, wherein the sulfosuccinate is present in the breaking composition in a concentration of from 10% v/v to 40% v/v.

7. The method of claim 1, wherein the solvent is present in the breaking composition in a concentration of from 40% v/v to 90% v/v.

8. The method of claim 1, wherein the solvent and the sulfosuccinate are present in the breaking composition in a ratio of solvent to sulfosuccinate of from 1.2:1 to 10:1.

9. The method of claim 1, wherein the solvent comprises an alcohol, an ether, an aromatic organic solvent, or any combination thereof.

10. The method of claim 9, wherein the solvent comprises an alcohol, and wherein the alcohol is selected from hexanol, isopropanol, 2-ethylhexanol, 4-methyl-2-pentanol, 2-butoxyethanol, benzyl alcohol, isobutanol, sec-butanol, tert-butanol, pentaerythritol, trimethylolpropane, glycerol, ethylene glycol, propylene glycol, or any combination thereof.

11. The method of claim 1, wherein the breaking composition comprises the sulfosuccinate, glycerol, and 4-methyl-2-pentanol.

12. The method of claim 11, wherein the breaking composition comprises from 15% v/v to 25% v/v sulfosuccinate, from 70% v/v to 80% v/v 4-methyl-2-pentanol, and from 1% v/v to 5% v/v glycerol.

13. The method of claim 1, wherein the foam, the emulsion, or any combination thereof is present on or within equipment associated with an oil and gas operation.

14. The method of claim 1, wherein the foam, the emulsion, or any combination thereof is present in a separator, and wherein the method comprises injecting the breaking composition into the separator, injecting the breaking composition upstream of the separator, injecting the breaking composition downstream of the separator, or any combination thereof.

15. The method of claim 1, wherein the foam, the emulsion, or any combination thereof is present in a pipe, in a pipeline, in a wellhead, or any combination thereof, and wherein the method comprises injecting the breaking composition into the pipe, into the pipeline, into the wellhead, or any combination thereof.

16. The method of claim 15, wherein the method comprises continuously injecting the breaking composition.

17. The method of claim 1, wherein the foam, the emulsion, or any combination thereof comprises a produced fluid.

18. The method of claim 17, wherein the produced fluid comprises an aqueous component, a hydrocarbon component, and one or more surfactants.

19. A breaking composition comprising a sulfosuccinate and a solvent, wherein the solvent has an octanol/water partition coefficient ([P]) at 25°, and wherein the log of the partition coefficient at 25° (log [P]) is from 0.1 to 5;

wherein the sulfosuccinate is present in an amount sufficient to reduce foam by at least 50%.

* * * * *